(12) United States Patent
Berolini et al.

(10) Patent No.: US 12,033,801 B2
(45) Date of Patent: Jul. 9, 2024

(54) MULTILAYER CERAMIC CAPACITOR HAVING ULTRA-BROADBAND PERFORMANCE

(71) Applicant: KYOCERA AVX Components Corporation, Fountain Inn, SC (US)

(72) Inventors: Marianne Berolini, Greenville, SC (US); Jeffrey A Horn, Simpsonville, SC (US)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 0 days.

(21) Appl. No.: 17/567,936

(22) Filed: Jan. 4, 2022

(65) Prior Publication Data

US 2022/0216011 A1 Jul. 7, 2022

Related U.S. Application Data

(60) Provisional application No. 63/134,620, filed on Jan. 7, 2021.

(51) Int. Cl.
| | | |
|---|---|---|
| *H01G 4/30* | (2006.01) | |
| *H01G 4/005* | (2006.01) | |
| *H01G 4/012* | (2006.01) | |
| *H01G 4/12* | (2006.01) | |
| *H01G 4/232* | (2006.01) | |

(52) U.S. Cl.
CPC ............. *H01G 4/30* (2013.01); *H01G 4/005* (2013.01); *H01G 4/012* (2013.01); *H01G 4/12* (2013.01); *H01G 4/232* (2013.01)

(58) Field of Classification Search
CPC .......... H01G 4/232; H01G 4/005; H01G 4/30; H01G 4/12; H01G 4/012
USPC ............. 361/301.4, 303, 306.3, 321.1, 321.3
See application file for complete search history.

(56) References Cited

U.S. PATENT DOCUMENTS

| | | |
|---|---|---|
| 7,554,424 B2 | 6/2009 | Mruz |
| 7,688,568 B1 | 3/2010 | Lee et al. |
| 8,446,705 B2 | 5/2013 | Ritter et al. |
| 9,305,704 B2 | 4/2016 | Park et al. |
| 10,304,629 B2 | 5/2019 | Kitamura et al. |
| 10,395,825 B2 | 8/2019 | Jang et al. |
| 10,943,735 B2 | 3/2021 | Horn et al. |
| 11,004,603 B2 | 5/2021 | Horn et al. |
| 11,031,183 B2 | 6/2021 | Horn et al. |

(Continued)

*Primary Examiner* — Arun Ramaswamy
(74) *Attorney, Agent, or Firm* — Dority & Manning, P.A.

(57) ABSTRACT

A broadband multilayer ceramic capacitor may include a first external terminal and a second external terminal. A bottom portion of the first external terminal may be spaced apart from a bottom portion of the second external terminal by a bottom external terminal spacing distance. A first active electrode layer may include a first active electrode connected with the first external terminal and a second active electrode connected with the second external terminal and co-planar with the first electrode. A second active electrode layer may include a third active electrode connected to the first external terminal and a fourth active electrode connected to the second external terminal and co-planar with the fourth electrode. The first active electrode may overlap the fourth active electrode in the longitudinal direction. A ratio of a length of the capacitor to the bottom external terminal spacing distance may be greater than about 4.

17 Claims, 16 Drawing Sheets

(56) References Cited

U.S. PATENT DOCUMENTS

| | | |
|---|---|---|
| 11,195,656 B2 | 12/2021 | Berolini et al. |
| 11,211,201 B2 | 12/2021 | Berolini et al. |
| 11,270,842 B2 | 3/2022 | Berolini et al. |
| 11,361,907 B2 | 6/2022 | Berolini et al. |
| 11,495,406 B2 | 11/2022 | Berolini et al. |
| 11,664,169 B2 | 5/2023 | Berolini et al. |
| 11,676,763 B2 | 6/2023 | Horn et al. |
| 2010/0039749 A1* | 2/2010 | Ritter ............... H01G 4/30 29/25.42 |
| 2012/0188682 A1* | 7/2012 | Sato ............... H01G 4/232 336/200 |
| 2013/0299215 A1* | 11/2013 | Taseda ............... H01G 4/2325 174/255 |
| 2014/0133063 A1 | 5/2014 | Sakuratani et al. |
| 2015/0016014 A1* | 1/2015 | Park ............... H01G 2/065 156/89.12 |
| 2015/0060122 A1* | 3/2015 | Lee ............... H01G 4/12 361/301.4 |
| 2015/0068792 A1 | 3/2015 | Cho et al. |
| 2015/0223334 A1* | 8/2015 | Nakagawa ............... H01G 4/12 174/258 |
| 2015/0318110 A1 | 11/2015 | Lee et al. |
| 2017/0164466 A1 | 6/2017 | Park et al. |
| 2018/0025844 A1* | 1/2018 | Sato ............... H01G 4/008 361/321.2 |
| 2018/0061574 A1* | 3/2018 | Kitamura ............... H01G 4/258 |
| 2018/0330884 A1 | 11/2018 | Chang et al. |
| 2018/0374646 A1* | 12/2018 | Ward ............... H01G 4/30 |
| 2020/0243265 A1* | 7/2020 | Berolini ............... H01G 4/012 |
| 2021/0193392 A1 | 6/2021 | Horn et al. |
| 2022/0093332 A1 | 3/2022 | Berolini et al. |
| 2022/0115182 A1 | 4/2022 | Berolini et al. |
| 2022/0189691 A1 | 6/2022 | Berolini et al. |
| 2022/0216007 A1 | 7/2022 | Berolini et al. |
| 2023/0068137 A1 | 3/2023 | Berolini et al. |

\* cited by examiner

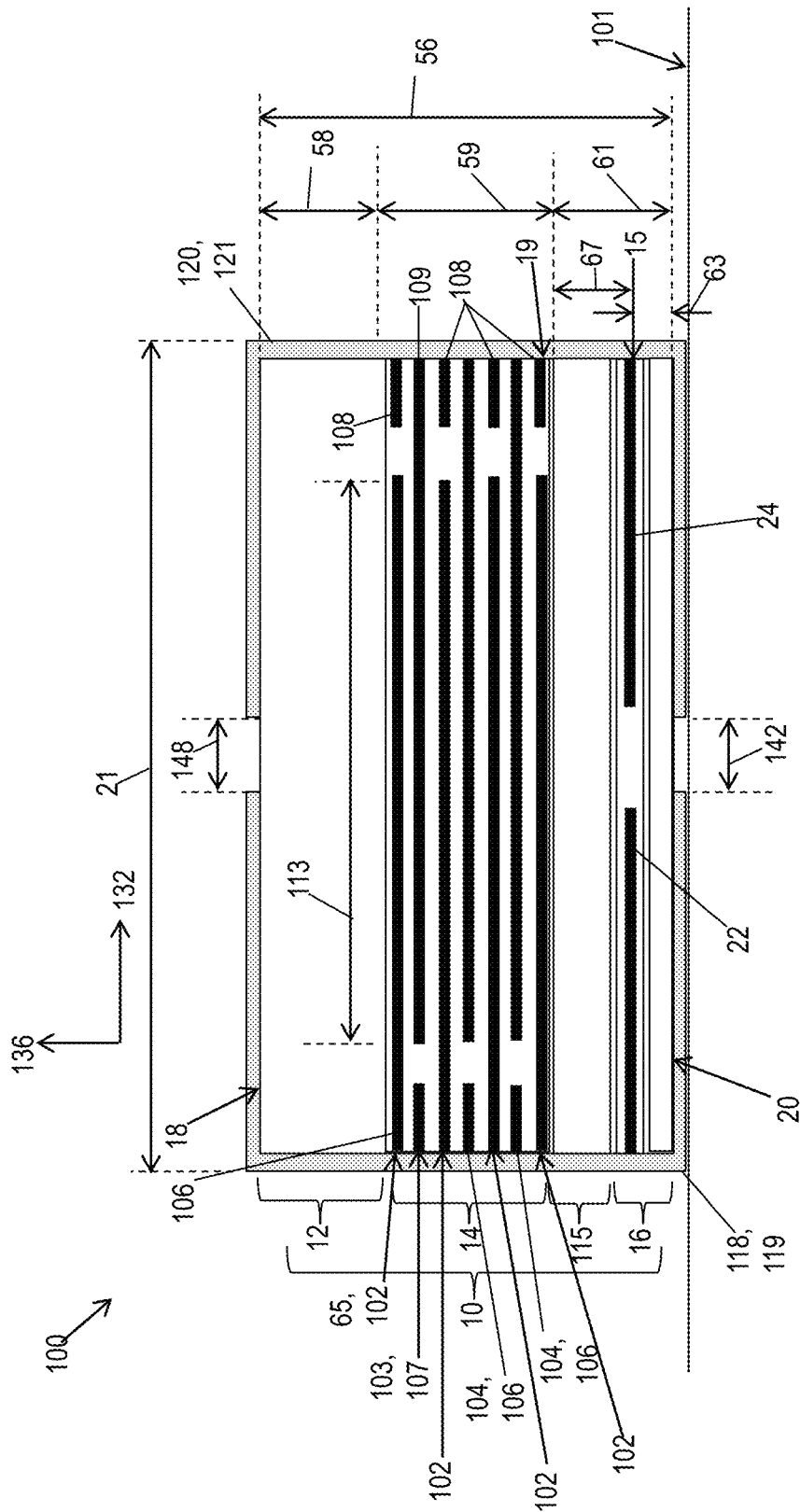

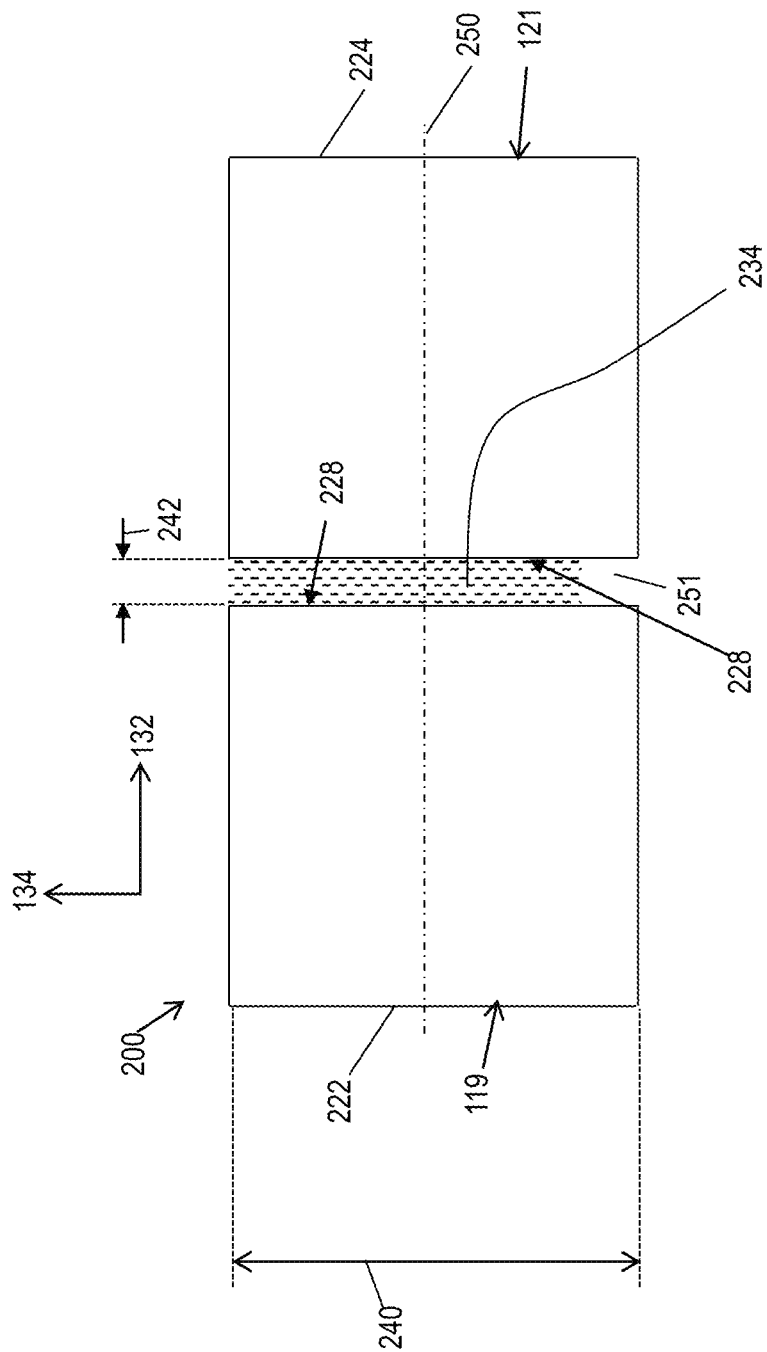

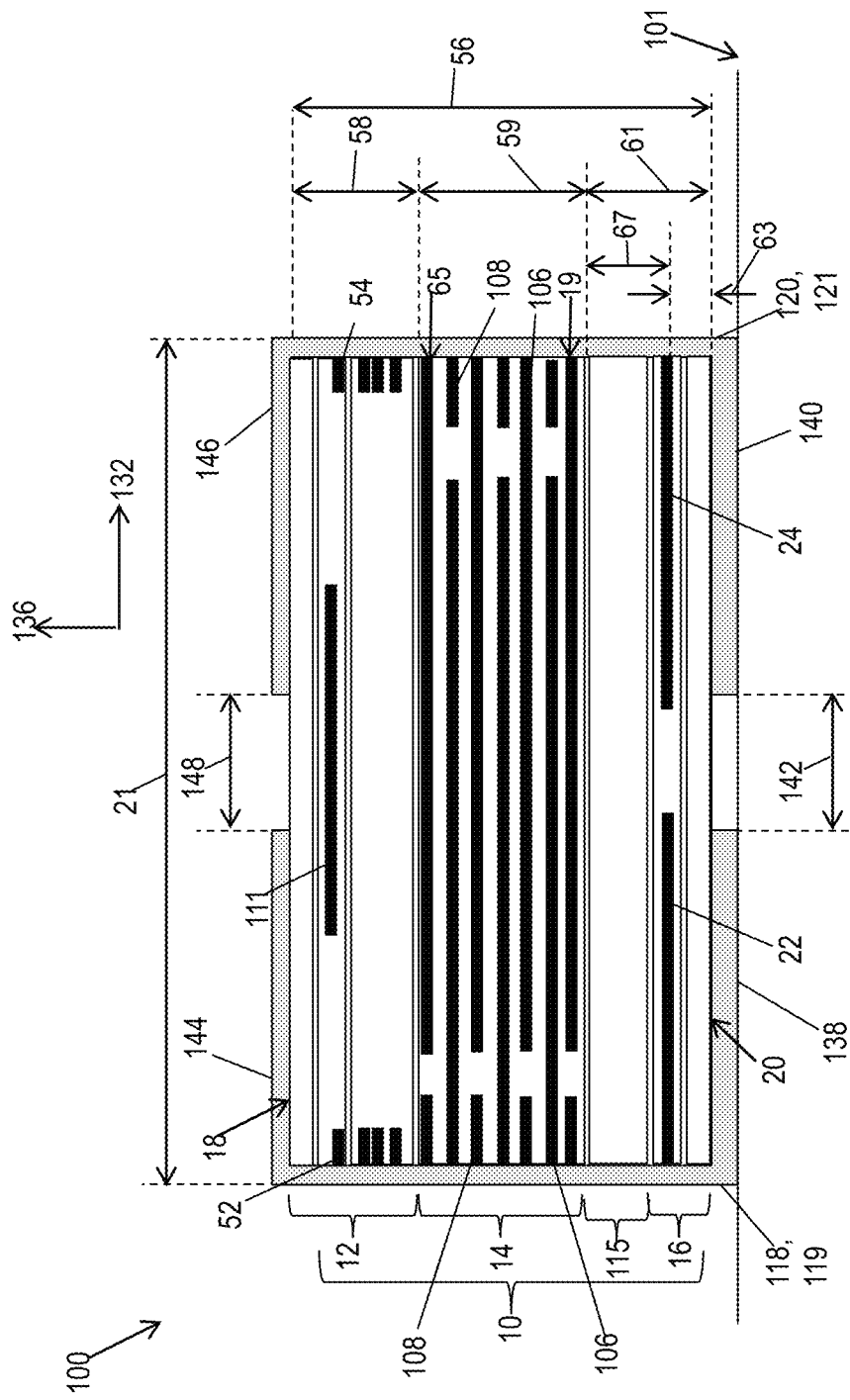

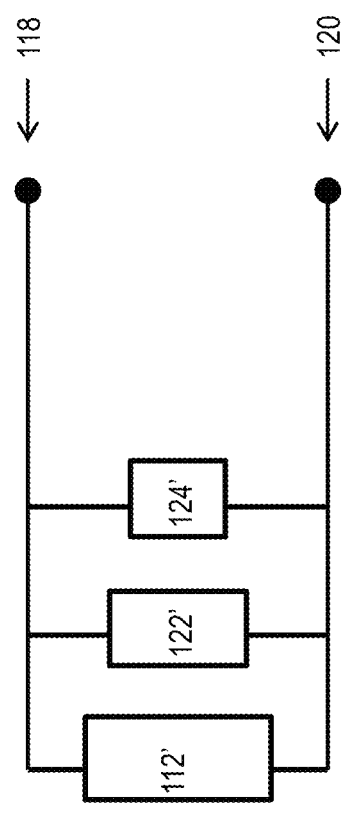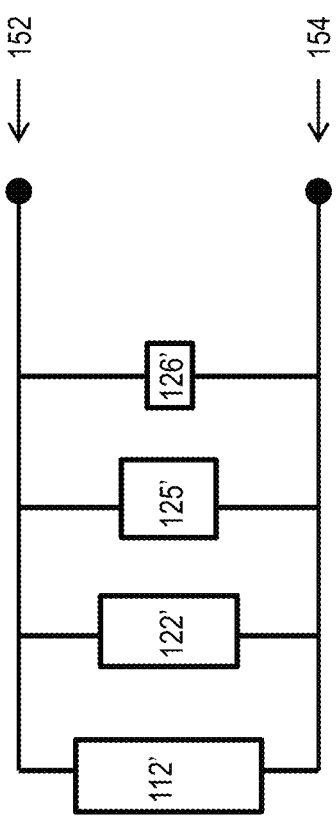
Figure 4A
Figure 4B

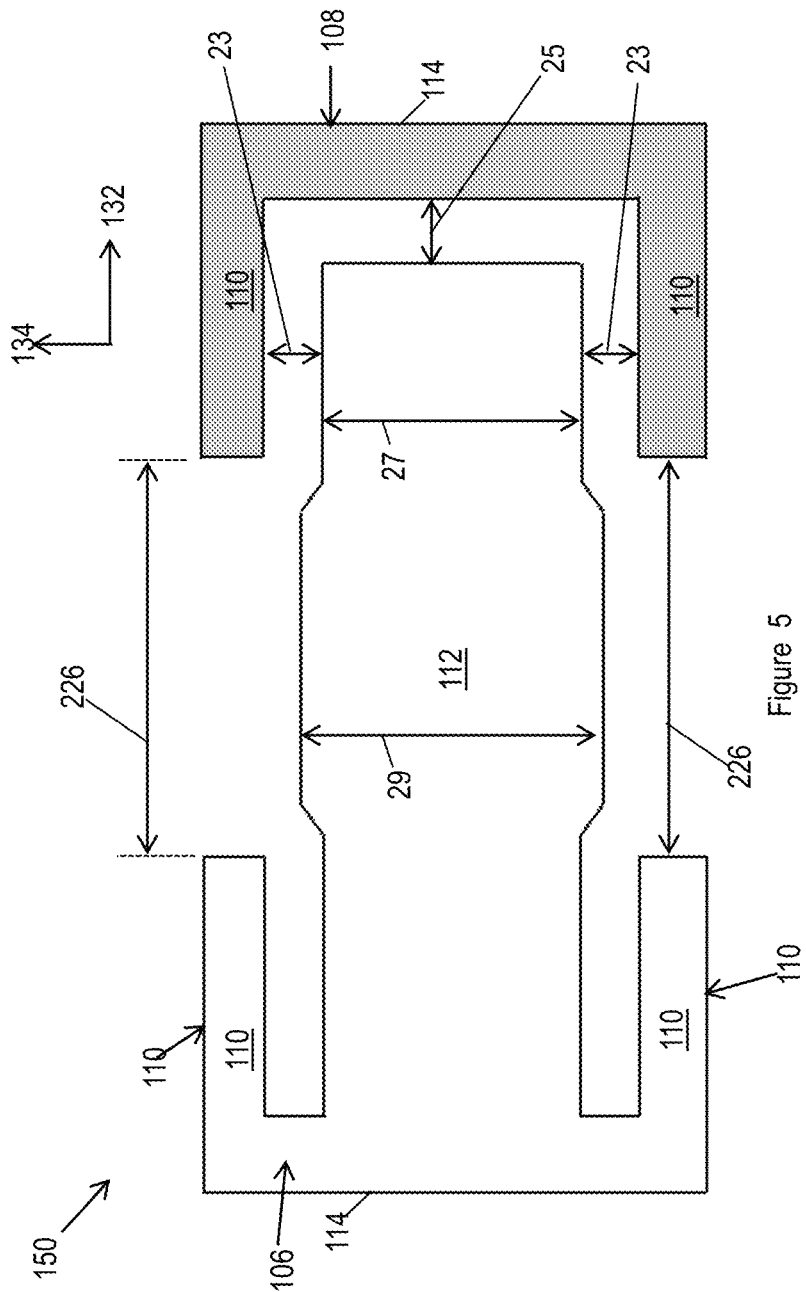

MULTILAYER CERAMIC CAPACITOR HAVING ULTRA-BROADBAND PERFORMANCE

CROSS REFERENCE TO RELATED APPLICATION

The present application claims filing benefit of U.S. Provisional Patent Application Ser. No. 63/134,620 having a filing date of Jan. 7, 2021, which is incorporated herein by reference in its entirety.

BACKGROUND OF THE INVENTION

The diversity of modern technical applications creates a need for efficient electronic components and integrated circuits for use therein. Capacitors are a fundamental component used for filtering, coupling, bypassing and other aspects of such modern applications which may include wireless communications, alarm systems, radar systems, circuit switching, matching networks, and many other applications. A dramatic increase in the speed and packing density of integrated circuits requires advancements in coupling capacitor technology in particular. When high-capacitance coupling capacitors are subjected to the high frequencies of many present applications, performance characteristics become increasingly more important. Because capacitors are fundamental to such a wide variety of applications, their precision and efficiency is imperative. Many specific aspects of capacitor design have thus been a focus for improving their performance characteristics.

SUMMARY OF THE INVENTION

In accordance with one embodiment of the present invention, a broadband multilayer ceramic capacitor may include a monolithic body including a plurality of dielectric layers stacked in a Z-direction. A first external terminal may be disposed along a first end of the capacitor. The first external terminal may include a bottom portion that extends along a bottom surface of the capacitor. A second external terminal may be disposed along a second end of the capacitor that is opposite the first end in the longitudinal direction. The second external terminal may include a bottom portion that extends along the bottom surface of the capacitor. The bottom portion of the first external terminal and the bottom portion of the second external terminal may be spaced apart in a longitudinal direction by a bottom external terminal spacing distance. The capacitor may include a plurality of active electrode layers. A first active electrode layer of the plurality of active electrode layers may include a first active electrode connected with the first external terminal and a second active electrode connected with the second external terminal. The second electrode may be co-planar with the first electrode. A second active electrode layer of the plurality of active electrode layers may include a third active electrode connected with the first external terminal and a fourth active electrode connected with the second external terminal. The third electrode may be co-planar with the fourth electrode. The first active electrode may overlap the fourth active electrode in the longitudinal direction. The capacitor has a capacitor length in the longitudinal direction between the first end and the second end. A ratio of the capacitor length to the bottom external terminal spacing distance may be greater than about 4.

In accordance with another embodiment of the present invention, a method of forming a broadband multilayer ceramic capacitor can include forming a plurality of active electrodes on a plurality of active electrode layers. At least one active electrode layer of the plurality of active electrode layers can include a first active electrode and a second active electrode. A second active electrode layer of the plurality of active electrode layers can include a third active electrode and a fourth active electrode. The third electrode can be co-planar with the fourth electrode. The first active electrode can overlap the fourth active electrode in the longitudinal direction. The method can include stacking the plurality of active electrode layers with a plurality of dielectric layers to form a monolithic body. The method can include depositing a first external terminal along a first end of the capacitor that connects with the first active electrode and the third active electrode. The first external terminal can include a bottom portion that extends along a bottom surface of the capacitor. The method can include depositing a second external terminal along a second end of the capacitor that is opposite the first end. The second external terminal can connect with the second active electrode and the fourth active electrode. The second external terminal can include a bottom portion that extends along the bottom surface of the capacitor. The bottom portion of the first external terminal and the bottom portion of the second external terminal can be spaced apart in a longitudinal direction by a bottom external terminal spacing distance. The capacitor can have a capacitor length in the longitudinal direction between the first end and the second end. A ratio of the capacitor length to the bottom external terminal spacing distance can be less than about 4.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 1C illustrates a side elevation view of an embodiment of a capacitor including shield electrodes according to aspects of the present disclosure;

FIG. 2B illustrates another embodiment of a shield electrode layer, which may be included in a shield electrode region of the capacitor of FIGS. 1C, 3A, and 3B according to aspects of the present disclosure;

FIG. 3A illustrates a side cross sectional view of another embodiment of a capacitor including dummy electrode tabs and a floating electrode according to aspects of the present disclosure;

FIG. 4A depicts a circuit schematic representation of the embodiment of a capacitor illustrated in FIGS. 1A through 1C with multiple capacitive regions according to aspects of the present disclosure;

FIG. 4B depicts a circuit schematic representation of the embodiment of a capacitor illustrated in FIGS. 2A through 2B with multiple capacitive regions according to aspects of the present disclosure;

FIG. 5 illustrates an embodiment of an electrode pattern having an enlarged central portion according to aspects of the present disclosure;

DETAILED DESCRIPTION OF THE PREFERRED EMBODIMENTS

Figure 1A:
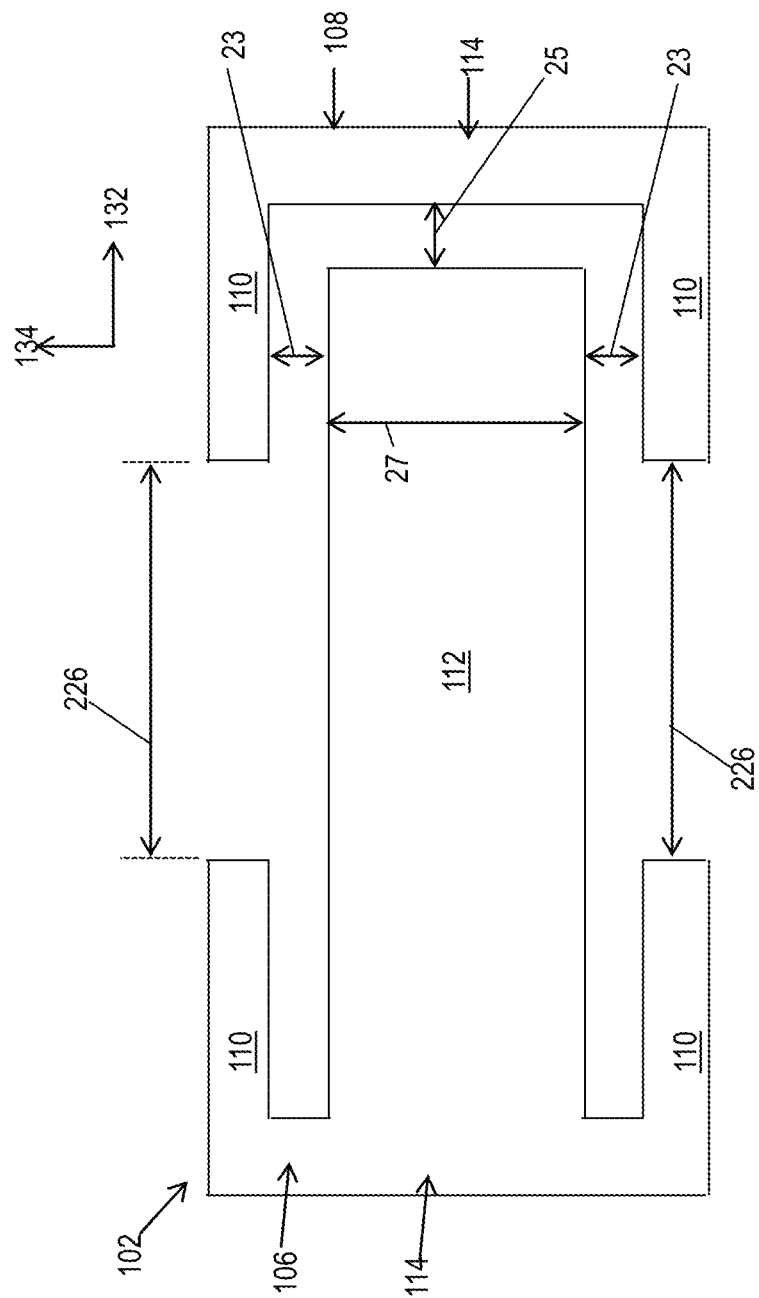
FIG. 1A illustrates a top view of one embodiment of an active electrode layer of a capacitor according to aspects of the present disclosure.

It is to be understood by one of ordinary skill in the art that the present discussion is a description of exemplary embodiments only, and is not intended as limiting the broader aspects of the present invention.

Generally speaking, the capacitor includes alternating dielectric layers and electrode layers, which may form at least a part of the monolithic body of the capacitor. By arranging the dielectric layers and the electrode layers in a stacked or laminated configuration, the capacitor may be referred to as a multilayer capacitor and in particular a multilayer ceramic capacitor, for instance when the dielectric layers include a ceramic.

The capacitor may include a monolithic body including a plurality of dielectric layers stacked in a Z-direction. A first external terminal can be disposed along a first end of the capacitor. The first external terminal can include a bottom portion that extends along a bottom surface of the capacitor. A second external terminal can be disposed along a second end of the capacitor that is opposite the first end in the longitudinal direction. The second external terminal can include a bottom portion that extends along the bottom surface of the capacitor. The bottom portion of the first external terminal and the bottom portion of the second external terminal can be spaced apart in a longitudinal direction by a bottom external terminal spacing distance.

The bottom external terminal spacing distance can be relatively small such that a fringe effect capacitance is created between the external terminations. The fringe effect capacitance can contribute to the excellent high frequency performance of the capacitor. For example, the capacitor can have a capacitor length in the longitudinal direction between the first end and the second end. A ratio of the capacitor length to the bottom external terminal spacing distance can be greater than about 4, in some embodiments greater than about 5, in some embodiments greater than about 7, in some embodiments greater than about 10, and in some embodiments greater than about 20.

In some embodiments, the bottom external terminal spacing distance can be less than about 250 microns, in some embodiments less than about 200 microns, in some embodiments less than about 150 microns, in some embodiments less than about 100 microns, in some embodiments less than about 75 microns, in some embodiments less than about 50 microns.

The capacitor can include a plurality of active electrode layers. A first active electrode layer of the plurality of active electrode layers can include a first active electrode connected with the first external terminal and a second active electrode connected with the second external terminal. The second electrode can be co-planar with the first electrode. A second active electrode layer of the plurality of active electrode layers can include a third active electrode connected with the first external terminal and a fourth active electrode connected with the second external terminal. The third active electrode can be co-planar with the fourth active electrode. The first active electrode can overlap the fourth active electrode in the longitudinal direction. The overlap between the first active electrode and the fourth active electrode can provide capacitance between the first external terminal and the second external terminal. The first active electrode can overlap the fourth active electrode for along an overlap distance. The overlap distance can be a significant portion of the length of the capacitor. A ratio the overlap distance to the capacitor length can be greater than about 0.4, in some embodiments greater than about 0.5, and in some embodiments greater than about 0.6. For example, the overlap distance can range from about 0.4 to about 0.98, in some embodiments from about 0.5 to about 0.95, and in some embodiments from about 0.6 to about 0.9.

The active electrodes can have configurations provide fringe effect capacitance between co-planar electrodes. This fringe effect capacitance can also contribute to the excellent high frequency performance of the device. For example, the first active electrode can have a central portion that extends away from a base portion of the first active electrode in a longitudinal direction. The second active electrode can include a base portion and at least one arm extending towards the first end in the longitudinal direction. The arm(s) of the second active electrode can overlap the central portion of the first active electrode in the longitudinal direction.

The first and second active electrodes can form a relatively small central end gap and/or central edge gap, which can provide fringe effect capacitance between the active electrodes. For example, a central end gap distance can be formed in the longitudinal direction between the central portion of the first active electrode and the base portion of the second active electrode. The central end gap distance can be formed in the longitudinal direction between the central portion of the first active electrode and the base portion of the second active electrode. In some embodiments, the central end gap can be less than about 250 microns, in some embodiments less than about 150 microns, in some embodiments less than about 120 microns, and in some embodiments less than about 100 microns, and in some embodiments less than about 80 microns.

The central edge gap distance can be formed in the lateral direction between the central portion of the first active electrode and the arm(s) of the second active electrode. In some embodiments, the central edge gap can be less than about 250 microns, in some embodiments less than about 150 microns, in some embodiments less than about 120 microns, and in some embodiments less than about 100 microns, and in some embodiments less than about 80 microns. A ratio of the central edge gap distance to the bottom external terminal spacing distance can range from about 0.5 to about 2.

The central end gap distance and/or central edge gap distance may be relatively similar to the bottom external terminal spacing distance. For example, a ratio of the central end gap distance to the bottom external terminal spacing distance can range from about 0.5 to about 2, in some embodiments from about 0.6 to about 1.8, in some embodiments from about 0.7 to about 1.6, in some embodiments from about 0.8 to about 1.4, and in some embodiments from about 0.9 to about 1.1. A ratio of the central edge gap distance to the bottom external terminal spacing distance can range from about 0.5 to about 2, in some embodiments from about 0.6 to about 1.8, in some embodiments from about 0.7 to about 1.6, in some embodiments from about 0.8 to about 1.4, and in some embodiments from about 0.9 to about 1.1. Lastly, the central edge gap can be relatively similar in size to the central end gap. For example, a ratio of the central end gap distance to the central edge gap distance can range from about 0.5 to about 2, in some embodiments from about 0.6 to about 1.8, in some embodiments from about 0.7 to about 1.6, in some embodiments from about 0.8 to about 1.4, and in some embodiments from about 0.9 to about 1.1.

The sizing and spacing of the co-planar active electrodes can be selectively configured in combination with the sizing and spacing of the external terminations to provide improved capacitance along a greater high frequency range than previous capacitors. For example, the bottom external terminal spacing distance can be selected to provide an external fringe-effect capacitance of the external terminals that improves response characteristics of the capacitor across a first frequency range. The active electrode configuration can be selected to provide fringe effect capacitance that improves the response of the capacitor across a second frequency range that extends high or lower (or is entirely distinct) from the first frequency range. Thus, the combination of these features can provide better high frequency performance of the capacitor than either feature on its own.

In some embodiments, the capacitor can include one or more shield electrode layers. The shield electrode layer(s) can have a variety of shapes and configurations. As examples, each shield electrode layer can include a pair of opposite, co-planar shield electrodes. In some embodiments, the shield electrodes can be square. In other embodiments, the shield electrodes can have a step or notch.

The shield electrode layer(s) may be located within the ceramic body. The shield electrodes may be located between the active electrode region and a bottom surface of the ceramic body. The shield electrodes are generally spaced apart from the active electrodes by a shield-to-active distance such that the shield electrode region is spaced apart and/or distinct from the active electrode region. The active electrode layers of the plurality of active electrode layers may be uniformly spaced apart from each other in the Z-direction by an active electrode spacing distance, which is sometimes referred to as "drop." The shield-to-active distance may be greater than the active electrode spacing distance. For instance, the shield-to-active distance may be 2 times or more greater than the active electrode spacing distance, in some embodiments 3 times or more greater, in some embodiments 4 times or greater, in some embodiments 5 times or greater, and in some embodiments 10 times or greater.

As examples, the active electrode spacing distance may range from about 0.1 microns to about 2 microns, and in some embodiments from about 0.2 to about 0.5 microns. The shield-to-active distance may range from 5 microns to about 80 microns, in some embodiments from about 10 microns to about 70 microns, in some embodiments from about 20 microns to about 60 microns, and in some embodiments from about 30 microns to about 50 microns.

In some embodiments, the monolithic body may be free of electrode layers in a region between the active electrode region and the shield electrode region in the Z-direction. However, in other embodiments, the region between the active electrode region and the shield electrode region may include one or dummy electrode tabs, which may aid in forming the external terminals. The dummy electrode tabs generally extend less than 25% of a length of the capacitor from the respective ends of the capacitor. For instance, a first plurality of dummy electrode tabs may be connected with the first external terminal, and a second plurality of dummy electrode tabs may be connected with the second external terminal.

In some embodiments, the capacitor may include a dielectric region between the active electrode region and a top of the capacitor. In other words, the active electrode region may be located between the dielectric region and the shield electrode region in the Z-direction. The dielectric region may extend from the active electrode region to a top surface of the broadband multilayer ceramic capacitor. The dielectric region and/or region between the active electrode region and the shield electrode region (e.g., an "additional dielectric region") may be free of active electrodes and/or shield electrodes. For example, the dielectric region(s) may be free of electrode layers that extend greater than 25% of a length of the capacitor, in some embodiments greater than 20% of the length of the capacitor, in some embodiments greater than 15% of the length of the capacitor, in some embodiments greater than 10% of the length of the capacitor, in some embodiments greater than 5% of the length of the capacitor, and in some embodiments greater than 2% of the length of the capacitor. For instance, in some embodiments, the dielectric region(s) may include one or more floating electrodes and/or dummy electrode tabs. However, in other embodiments, the dielectric region(s) may be free of all electrode layers. In some embodiments, the broadband multilayer ceramic capacitor may be free of shield electrodes above a plurality of active electrode layers in the Z-direction. In some embodiments, the broadband multilayer ceramic capacitor may be free of shield electrodes above a lowest electrode layer of the plurality of active electrode layers in the Z-direction.

The broadband multilayer ceramic capacitor may have a capacitor thickness in the Z-direction between the top surface and the bottom surface. The dielectric region may have a dielectric region thickness in the Z-direction. A ratio of the capacitor thickness to the dielectric region thickness may range from about 1.1 to about 20, in some embodiments from about 1.5 to about 10, in some embodiments from about 1.7 to about 5.

The shield electrode region may have a shield electrode region thickness in the Z-direction. The shield electrode region thickness may be defined between a lowest shield electrode of the shield electrode region and a highest shield electrode of the shield electrode region with respect to the Z-direction. A ratio of the capacitor thickness to the shield electrode region thickness may range from about 1.1 to about 20, in some embodiments from about 1.5 to about 10, in some embodiments from about 1.7 to about 5.

The active electrode region may have an active electrode region thickness in the Z-direction. The active electrode region thickness may be defined between a lowest active electrode layer and a highest active electrode layer. A ratio of the capacitor thickness to the active electrode region thickness may range from about 1.1 to about 20, in some embodiments from about 1.5 to about 10, in some embodiments from about 1.7 to about 5.

The multilayer ceramic capacitor may exhibit a low insertion loss across a broad range of frequencies. In general, the insertion loss is the loss of power through the capacitor and may be measured using any method generally known in the art. For example, the capacitor may exhibit an insertion loss that is greater than about −0.5 dB from about 1 GHz to about 40 GHz, in some embodiments greater than about −0.4 dB, in some embodiments greater than about −0.35 dB, and in some embodiments greater than about −0.3 dB. In some embodiments the capacitor may exhibit an insertion loss that is greater than about −0.4 dB at about 10 GHz, in some embodiments greater than about −0.35 dB at about 10 GHz, in some embodiments greater than about −0.3 dB, and in some embodiments greater than about −0.25 dB at about 10 GHz. The capacitor may exhibit an insertion loss that is greater than about −0.4 dB at about 20 GHz, in some embodiments greater than about −0.35 dB at about 20 GHz, and in some embodiments greater than about −0.3 dB at about 20 GHz. The capacitor may exhibit an insertion loss that is greater than about −0.4 dB at about 30 GHz, in some embodiments greater than about −0.35 dB at about 30 GHz, in some embodiments greater than about −0.3 dB at about 30 GHz, and in some embodiments greater than about −0.25 dB at about 30 GHz. The capacitor may exhibit an insertion loss that is greater than about −0.4 dB at about 40 GHz, in some embodiments greater than about −0.35 dB at about 40 GHz, in some embodiments greater than about −0.3 dB at about 40 GHz, and in some embodiments greater than about −0.25 dB at about 40 GHz.

In some embodiments, the broadband multilayer ceramic capacitor may exhibit an insertion loss that ranges from about −0.05 dB to about −0.4 dB from about 5 GHz to about 20 GHz, in some embodiments from about −0.05 dB to about −0.3 dB from about 10 GHz to about 20 GHz, in some embodiments from about −0.05 dB to about −0.3 dB from about 20 GHz to about 30 GHz, and in some embodiments from about −0.05 dB to about −0.3 dB from about 30 GHz to about 40 GHz.

I. Example Embodiments

Turning to FIGS. 1A-10, one embodiment of a multilayer ceramic capacitor 100 is disclosed. FIG. 1A illustrates a top view of one embodiment of an example active electrode layer 102 of the capacitor 100 according to aspects of the present disclosure. FIG. 1B illustrates multiple capacitive regions formed by the electrode layers 102 and shield layers 15. FIG. 1C illustrates a simplified side elevation view of one embodiment of the capacitor 100 of FIG. 1A according to aspects of the present disclosure. FIG. 1D is a simplified side elevation view of another embodiment of a capacitor 140. Referring to FIG. 1C, the multilayer capacitor 100 may include a plurality of electrode regions 10 that are stacked in the Z-direction 136. The plurality of electrode regions 10 may include a dielectric region 12, an active electrode region 14, a shield electrode region 16, and an additional dielectric region 115. The active electrode region 14 may be located between the dielectric region 12 and the shield electrode region 16 in the Z-direction 136. The dielectric region 12 may extend from the active electrode region 14 to a top surface 18 of the broadband multilayer ceramic capacitor 100. The capacitor 100 may include a bottom surface 20 opposite the top surface 18 in the Z-direction 136.

The electrode regions 10 may include a plurality of dielectric layers. Some dielectric layers may include electrode layers formed thereon. In general, the thickness of the dielectric layers and the electrode layers is not limited and can be any thickness as desired depending on the performance characteristics of the capacitor. For instance, the thickness of the electrode layers can be, but is not limited to, being about 500 nm or greater, such as about 1 μm or greater, such as about 2 μm or greater, such as about 3 μm or greater, such as about 4 μm or greater to about 10 μm or less, such as about 5 μm or less, such as about 4 μm or less, such as about 3 μm or less, such as about 2 μm or less. For instance, the electrode layers may have a thickness of from about 1 μm to about 2 μm. In addition, in one embodiment, the thickness of the dielectric layer may be defined according to the aforementioned thickness of the electrode layers. Also, it should be understood that such thicknesses of the dielectric layers may also apply to the layers between any active electrode layers, and/or shield electrode layers, when present and as defined herein.

In general, the present invention provides a multilayer capacitor having a unique electrode arrangement and configuration that provides various benefits and advantages. In this regard, it should be understood that the materials employed in constructing the capacitor may not be limited and may be any as generally employed in the art and formed using any method generally employed in the art.

In general, the dielectric layers are typically formed from a material having a relatively high dielectric constant (K), such as from about 10 to about 40,000 in some embodiments from about 50 to about 30,000, and in some embodiments, from about 100 to about 20,000.

In this regard, the dielectric material may be a ceramic. The ceramic may be provided in a variety of forms, such as a wafer (e.g., pre-fired) or a dielectric material that is co-fired within the device itself.

Particular examples of the type of high dielectric material include, for instance, NPO (COG) (up to about 100), X7R (from about 3,000 to about 7,000), X7S, Z5U, and/or Y5V materials. It should be appreciated that the aforementioned materials are described by their industry-accepted definitions, some of which are standard classifications established by the Electronic Industries Alliance (EIA), and as such should be recognized by one of ordinary skill in the art. For instance, such material may include a ceramic. Such materials may include a perovskite, such as barium titanate and related solid solutions (e.g., barium-strontium titanate, barium calcium titanate, barium zirconate titanate, barium strontium zirconate titanate, barium calcium zirconate titanate, etc.), lead titanate and related solid solutions (e.g., lead zirconate titanate, lead lanthanum zirconate titanate), sodium bismuth titanate, and so forth. In one particular embodiment, for instance, barium strontium titanate ("BSTO") of the formula $Ba_xSr_{1-x}TiO_3$ may be employed, wherein x is from 0 to 1, in some embodiments from about 0.15 to about 0.65, and in some embodiments, from about from 0.25 to about 0.6. Other suitable perovskites may include, for instance, $Ba_xCa_{1-x}TiO_3$ where x is from about 0.2 to about 0.8, and in some embodiments, from about 0.4 to about 0.6, $Pb_xZr_{1-x}TiO_3$ ("PZT") where x ranges from about 0.05 to about 0.4, lead lanthanum zirconium titanate ("PLZT"), lead titanate ($PbTiO_3$), barium calcium zirconium titanate ($BaCaZrTiO_3$), sodium nitrate ($NaNO_3$), $KNbO_3$, $LiNbO_3$, $LiTaO_3$, $PbNb_2O_6$, $PbTa_2O_6$, $KSr(NbO_3)$ and $NaBa_2(NbO_3)_5KHb_2PO_4$. Still additional complex perovskites may include $A[B1_{1/3}B2_{2/3}]O_3$ materials, where A is $Ba_xSr_{1-x}$ (x can be a value from 0 to 1); B1 is $Mg_yZn_{1-y}$ (y can be a value from 0 to 1); B2 is $Ta_zNb_{1-z}$ (z can be a value from 0 to 1). In one particular embodiment, the dielectric layers may comprise a titanate.

The electrode layers may be formed from any of a variety of different metals as is known in the art. The electrode layers may be made from a metal, such as a conductive metal. The materials may include precious metals (e.g., silver, gold, palladium, platinum, etc.), base metals (e.g., copper, tin, nickel, chrome, titanium, tungsten, etc.), and so forth, as well as various combinations thereof. Sputtered titanium/tungsten (Ti/W) alloys, as well as respective sputtered layers of chrome, nickel and gold, may also be suitable. The electrodes may also be made of a low resistive material, such as silver, copper, gold, aluminum, palladium, etc. In one particular embodiment, the electrode layers may comprise nickel or an alloy thereof.

FIG. 1A illustrates a top view of one embodiment of an active electrode pattern for one or more electrodes in the active electrode region 14 according to aspects of the present disclosure. More specifically, the active electrode region 14 may include first electrode layers 102 and second electrode layers 104 in an alternating arrangement, for example as described below with reference to FIG. 1B. Referring to FIG. 1A, each electrode layer 102, 104 may include a first active electrode 106 and a second active electrode 108. The first active electrode 106 may have a base portion 114 that extends along a longitudinal edge of the first active electrode 106 in the lateral direction 134. The first active electrode 106 may have a pair of electrode arms 110 extending from a base portion 114 in the longitudinal direction 132. The second active electrode 108 may have a base portion 114 that extends along a longitudinal edge of the second electrode layer 108 in the lateral direction 134. The second electrode 10 may have a pair of electrode arms 110 extending from the base portion 114 in the longitudinal direction 132.

The electrode arm(s) 110 of the first active electrode 106 may be generally longitudinally aligned with respect to the electrode arm(s) 110 of the second active electrode 108. Arm gap(s) 226 may be defined in the longitudinal direction 132 between aligned electrode arms 110 of the first and second electrodes 106, 108.

Figure 1B:
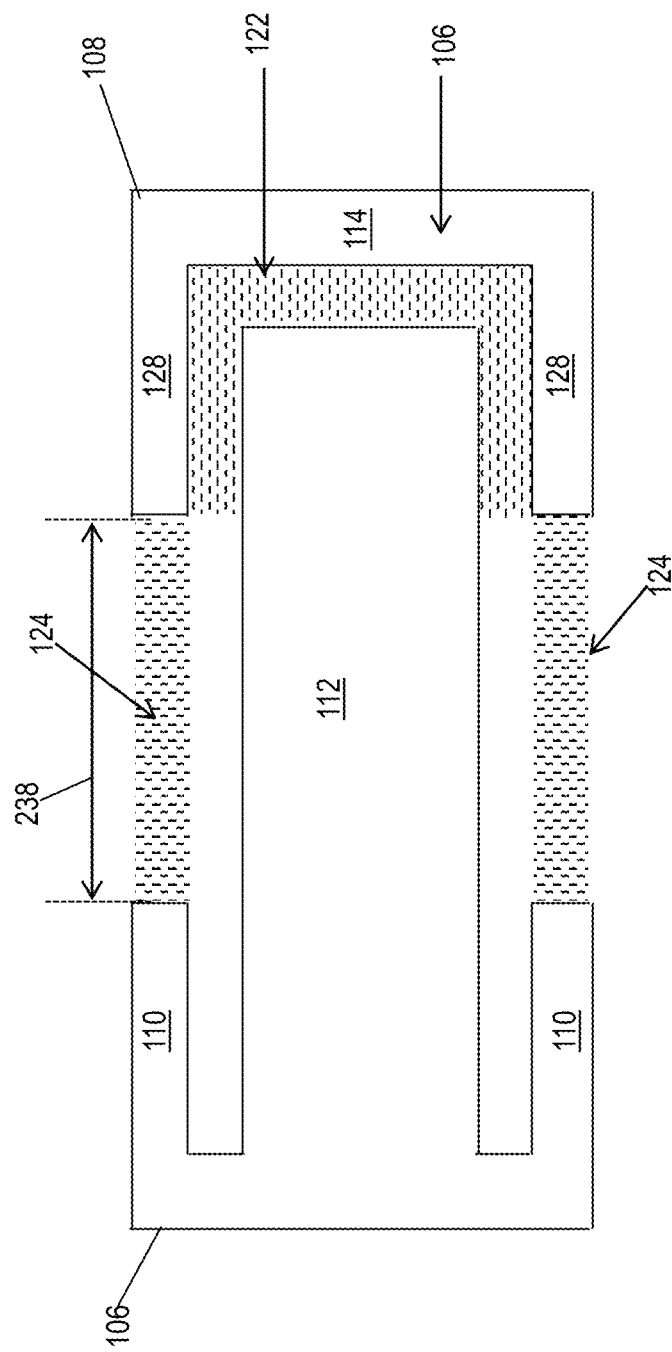
FIG. 1B illustrates multiple capacitive regions of the electrode pattern of FIG. 1A according to aspects of the present disclosure.

Referring to FIG. 1B, several capacitive regions may be formed between the first active electrode 106 and the second active electrode 108. For example, in some embodiments, a central capacitive region 122 may be formed between the central portion 112 of the first active electrode 106 and the base portion 114 and/or arms 128 of the second active electrode 108. In some embodiments, an arm gap capacitive region 124 may be formed within an arm gap 238 between the electrode arms 110 of the first active electrode 106 and the second active electrode 108.

Figure 1D:
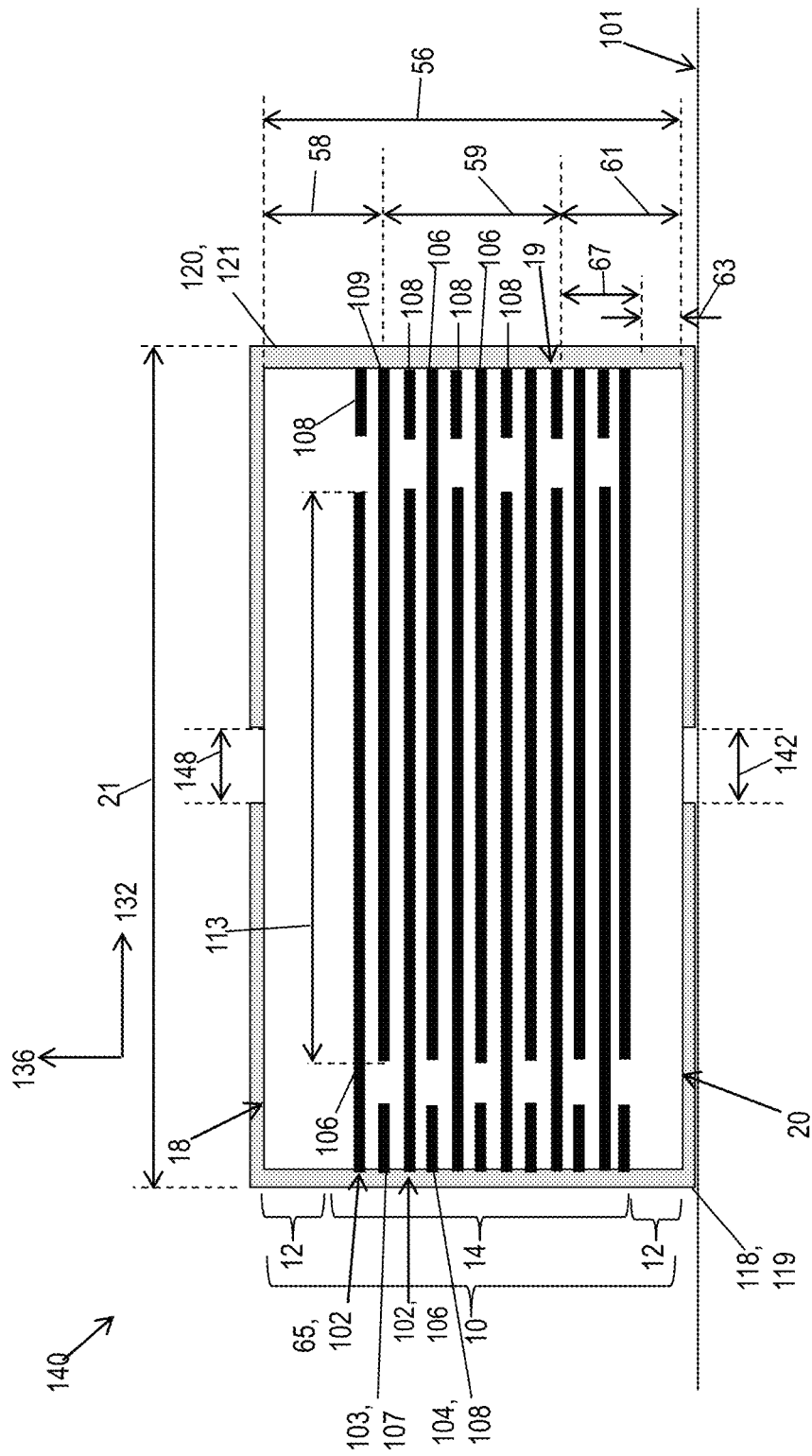
FIG. 1D illustrates a side elevation view of another capacitor without shield electrodes according to aspects of the present disclosure.

Referring to FIGS. 10 and 1D, a plurality of first electrode layers 102 and a plurality of second electrode layers 104 may be arranged in an alternating, mirrored configuration. As illustrated, the central portions 112 of the respective electrode layers at least partially overlap. FIG. 1C illustrates a total of four electrode layers; however, it should be understood that any number of electrode layers may be employed to obtain the desired capacitance for the desired application.

The plurality of active electrode layers 102, 104 may be arranged within the active electrode region 14. Each active electrode layer 102, 104 may include one or more active electrodes, for example as described below with reference to FIGS. 1A through 10. For example, a first active electrode layer 102 can include a first active electrode 106 and a second active electrode 108. A second active electrode layer 103 can include a third active electrode 107 connected with the first external terminal 118 and a fourth active electrode 109 connected with the second external terminal 120. The third active electrode 107 can be co-planar with the fourth active electrode 109. The first active electrode 106 can overlap the fourth active electrode 109 in the longitudinal direction 132. The first active electrode 106 can overlap the fourth active electrode along an overlap distance 113. The multilayer capacitor 100 may contain alternating first active electrode layers 102 and second active electrode layers 103, 104.

The capacitor 100 may include one or more shield electrode layers 15 in the shield electrode region 16. The shield electrode layers 15 may have a variety of configurations, for example as described below with reference to FIGS. 2A and 2B. The shield electrode region 16 may be located within the capacitor 100 between the active electrode region 14 and the bottom surface 20 of the ceramic body 100. The shield electrodes layers 15 are generally spaced apart from the active electrode layers 102, 104 by a shield-to-active distance 67 such that the shield electrodes 22, 24 are distinguished from the active electrodes 106, 108. For example, the active electrode layers 102, 104 may be uniformly spaced apart from each other in the Z-direction 136 by an active electrode spacing distance 105, which is sometimes referred to as "drop." The shield-to-active distance 67 may be greater than the active electrode spacing distance 105. For instance, the shield-to-active distance 67 may be two times or more greater than the active electrode spacing distance 105. As examples, the active electrode spacing distance 105 may range from about 0.5 microns to about 5 microns. The shield-to-active distance 67 may be greater than about 5 microns, in some embodiments greater than about 10 microns, in some embodiments greater than about 20 microns, and in some embodiments greater than about 30 microns.

In some embodiments, capacitor 100 may be free of electrode layers 102, 104 in an additional dielectric region 115 (e.g., a second dielectric region) between the active electrode region 14 and the shield electrode region 16 in the Z-direction 136. However, in other embodiments, the region 115 between the active electrode region 14 and the shield electrode region 16 may include one or dummy electrode tabs, for example as shown in FIG. 3A, which may aid in forming the external terminals.

In some embodiments, the broadband multilayer ceramic capacitor 100 may have a capacitor thickness 56 in the Z-direction 136 between the top surface 18 and the bottom surface 20. The dielectric region 12 may have a dielectric region thickness 58 in the Z-direction 136. In some embodiments, a ratio of the capacitor thickness 56 to the dielectric region thickness 58 may be less than about 10.

The active electrode region 14 may be an active electrode region thickness 59 in the Z-direction 136. The active electrode region 14 may be free of shield electrodes 22, 24, and/or may include only overlapping electrodes. The active electrode region thickness 59 may be defined between the lowest active electrode layer 19 and a highest active electrode layer 65. A ratio of the capacitor thickness 56 to the active electrode region thickness 59 may range from about 1.1 to about 20.

The shield electrode region 16 may have a shield electrode region thickness 61 in the Z-direction 136. The shield electrode region thickness 61 may be defined between a lowest shield electrode 137 of the shield electrode region 16 and a highest shield electrode 138 of the shield electrode region 16 with respect to the Z-direction 136. A ratio of the capacitor thickness 56 to the shield electrode region thickness 61 may range from about 1.1 to about 20.

In some embodiments, a shield-to-bottom-surface distance 63 may be defined as a distance between the shield electrodes 22, 24 and the bottom surface 20 of the capacitor 100. If multiple shield electrode layers 15 are included, the shield-to-bottom-surface distance 63 may be defined as the distance between the lowest of the shield electrode layers 15 and the bottom surface 20. A ratio of the capacitor thickness 56 to the shield-to-bottom-surface distance 63 may be greater than about 2.

In some embodiments, the shield electrodes 22, 24 may be spaced apart from the active electrodes 106, 108 by a first shield-to-active distance 67. The first shield-to-active distance 67 may be defined between the lowest active electrode 19 and the top shield electrode 138 closest to the lowest active electrode 19 in the Z-direction 136. A ratio of the first shield-to-active distance 67 to the shield-to-bottom-surface distance 63 may range from about 1 to about 20, in some embodiments from about 2 to about 10, and in some embodiments from about 3 to about 5.

In general, regarding embodiments discussed herein, the external terminals 118, 120 may be formed from any of a variety of different metals as is known in the art. External terminals 118, 120 may be formed from any of a variety of different metals as is known in the art. The external terminals 118, 120 may be made from a metal, such as a conductive metal. The materials may include precious metals (e.g., silver, gold, palladium, platinum, etc.), base metals (e.g., copper, tin, nickel, chrome, titanium, tungsten, etc.), and so forth, as well as various combinations thereof. In one particular embodiment, the external terminals 118, 120 may comprise copper or an alloy thereof.

The external terminals 118, 120 can be formed using any method generally known in the art. The external terminals 118, 120 may be formed using techniques such as sputtering, painting, printing, electroless plating or fine copper terminal (FCT), electroplating, plasma deposition, propellant spray/air brushing, and so forth.

In one embodiment, the external terminals 118, 120 may be formed such that the external terminals 118, 120 are relatively thick. For instance, such terminals 118, 120 may be formed by applying a thick film stripe of a metal to exposed portions of electrode layers (e.g., by dipping the capacitor in a liquid external terminal material). Such metal may be in a glass matrix and may include silver or copper. As an example, such strip may be printed and fired onto the capacitor. Thereafter, additional plating layers of metal (e.g., nickel, tin, solder, etc.) may be created over the terminal strips such that the capacitor is solderable to a substrate. Such application of thick film stripes may be conducted using any method generally known in the art (e.g., by a terminal machine and printing wheel for transferring a metal-loaded paste over the exposed electrode layers).

The thick-plated external terminals 118, 120 may have an average thickness of about 150 µm or less, such as about 125 µm or less, such as about 100 µm or less, such as about 80 µm or less. The thick-plated external terminals 118, 120 may have an average thickness of about 25 µm or more, such as about 35 µm or more, such as about 50 µm or more, such as about 75 or more µm. For instance, the thick-plated external terminals 118, 120 may have an average thickness of from about 25 µm to about 150 µm, such as from about 35 µm to about 125 µm, such as from about 50 µm to about 100 µm.

In another embodiment, the external terminals 118, 120 may be formed such that the external terminal is a thin-film plating of a metal. Such thin-film plating can be formed by depositing a conductive material, such as a conductive metal, on an exposed portion of an electrode layer. For instance, a leading edge of an electrode layer may be exposed such that it may allow for the formation of a plated terminal.

The thin-plated external terminals 118, 120 may have an average thickness of about 50 µm or less, such as about 40 µm or less, such as about 30 µm or less, such as about 25 µm or less. The thin-plated external terminals 118, 120 may have an average thickness of about 5 µm or more, such as about 10 µm or more, such as about 15 µm or more. For instance, the external terminals 118, 120 may have an average thickness of from about 5 µm to about 50 µm, such as from about 10 µm to about 40 µm, such as from about 15 µm to about 30 µm, such as from about 15 µm to about 25 µm.

In general, the external terminal may comprise a plated terminal. For instance, the external terminal may comprise an electroplated terminal, an electroless plated terminal, or a combination thereof. For instance, an electroplated terminal may be formed via electrolytic plating. An electroless plated terminal may be formed via electroless plating.

When multiple layers constitute the external terminal, the external terminal may include an electroplated terminal and an electroless plated terminal. For instance, electroless plating may first be employed to deposit an initial layer of material. The plating technique may then be switched to an electrochemical plating system which may allow for a faster buildup of material.

When forming the plated terminals 118, 120 with either plating method, a leading edge of the lead tabs of the electrode layers that is exposed from the main body of the capacitor is subjected to a plating solution. By subjecting, in one embodiment, the capacitor may be dipped into the plating solution.

The plating solution contains a conductive material, such as a conductive metal, is employed to form the plated terminal. Such conductive material may be any of the aforementioned materials or any as generally known in the art. For instance, the plating solution may be a nickel sulfamate bath solution or other nickel solution such that the plated layer and external terminal comprise nickel. Alternatively, the plating solution may be a copper acid bath or other suitable copper solution such that the plated layer and external terminal comprise copper.

Additionally, it should be understood that the plating solution may comprise other additives as generally known in the art. For instance, the additives may include other organic additives and media that can assist in the plating process. Additionally, additives may be employed in order to employ the plating solution at a desired pH. In one embodiment, resistance-reducing additives may be employed in the solutions to assist with complete plating coverage and bonding of the plating materials to the capacitor and exposed leading edges of the lead tabs.

The capacitor may be exposed, submersed, or dipped in the plating solution for a predetermined amount of time. Such exposure time is not necessarily limited but may be for a sufficient amount of time to allow for enough plating material to deposit in order to form the plated terminal. In this regard, the time should be sufficient for allowing the formation of a continuous connection among the desired exposed, adjacent leading edges of lead tabs of a given polarity of the respective electrode layers within a set of alternating dielectric layers and electrode layers.

In general, the difference between electrolytic plating and electroless plating is that electrolytic plating employs an electrical bias, such as by using an external power supply. The electrolytic plating solution may be subjected typically to a high current density range, for example, ten to fifteen amp/ft$^2$ (rated at 9.4 volts). A connection may be formed with a negative connection to the capacitor requiring formation of the plated terminals and a positive connection to a solid material (e.g., Cu in Cu plating solution) in the same plating solution. That is, the capacitor is biased to a polarity opposite that of the plating solution. Using this method, the conductive material of the plating solution is attracted to the metal of the exposed leading edge of the lead tabs of the electrode layers.

Prior to submersing or subjecting the capacitor to a plating solution, various pretreatment steps may be employed. These steps may be conducted for a variety of purposes, including to catalyze, to accelerate, and/or to improve the adhesion of the plating materials to the leading edges of the lead tabs.

Additionally, prior to plating or any other pretreatment steps, an initial cleaning step may be employed. This step may be employed to remove any oxide buildup that forms on the exposed lead tabs of the electrode layers. This cleaning step may be particularly helpful to assist in removing any buildup of nickel oxide when the internal electrodes or other conductive elements are formed of nickel. Component cleaning may be effected by full immersion in a preclean bath, such as one including an acid cleaner. In one embodiment, exposure may be for a predetermined time, such as on the order of about 10 minutes. Cleaning may also alternatively be effected by chemical polishing or harperizing steps.

In addition, a step to activate the exposed metallic leading edges of the lead tabs of the electrode layers may be performed to facilitate depositing of the conductive materials. Activation can be achieved by immersion in palladium salts, photo patterned palladium organometallic precursors (via mask or laser), screen printed or ink-jet deposited palladium compounds or electrophoretic palladium deposition. It should be appreciated that palladium-based activation is presently disclosed merely as an example of activation solutions that often work well with activation for exposed tab portions formed of nickel or an alloy thereof. However, it should be understood that other activation solutions may also be utilized.

Also, in lieu of or in addition to the aforementioned activation step, the activation dopant may be introduced into the conductive material when forming the electrode layers of the capacitor. For instance, when the electrode layer comprises nickel and the activation dopant comprises palladium, the palladium dopant may be introduced into the nickel ink or composition that forms the electrode layers. Doing so may eliminate the palladium activation step. It should be further appreciated that some of the above activation methods, such as organometallic precursors, also lend themselves to co-deposition of glass formers for increased adhesion to the generally ceramic body of the capacitor. When activation steps are taken as described above, traces of the activator material may often remain at the exposed conductive portions before and after terminal plating.

Additionally, post-treatment steps after plating may also be employed. Such steps may be conducted for a variety of purposes, including enhancing and/or improving adhesion of the materials. For instance, a heating (or annealing) step may be employed after performing the plating step. Such heating may be conducted via baking, laser subjection, UV exposure, microwave exposure, arc welding, etc.

As indicated herein, the external terminal may include at least one plating layer. In one embodiment, the external terminal may comprise only one plating layer. However, it should be understood that the external terminals may comprise a plurality of plating layers. For instance, the external terminals may comprise a first plating layer and a second plating layer. In addition, the external terminals may also comprise a third plating layer. The materials of these plating layers may be any of the aforementioned and as generally known in the art.

For instance, one plating layer, such as a first plating layer, may comprise copper or an alloy thereof. Another plating layer, such as a second plating layer, may comprise nickel or an alloy thereof. Another plating layer, such as a third plating layer, may comprise tin, lead, gold, or a combination, such as an alloy. Alternatively, an initial plating layer may include nickel, followed by plating layers of tin or gold. In another embodiment, an initial plating layer of copper may be formed and then a nickel layer.

In one embodiment, an initial or first plating layer may be a conductive metal (e.g., copper). This area may then be covered with a second layer containing a resistor-polymeric material for sealing. The area may then be polished to selectively remove resistive polymeric material and then plated again with a third layer containing a conductive, metallic material (e.g., copper).

The aforementioned second layer above the initial plating layer may correspond to a solder barrier layer, for example a nickel-solder barrier layer. In some embodiments, the aforementioned layer may be formed by electroplating an additional layer of metal (e.g., nickel) on top of an initial electrolessly or electrolytically plated layer (e.g., plated copper). Other exemplary materials for the aforementioned solder barrier layer include nickel-phosphorus, gold, and silver. A third layer on the aforementioned solder-barrier layer may in some embodiments correspond to a conductive layer, such as plated Ni, Ni/Cr, Ag, Pd, Sn, Pb/Sn or other suitable plated solder.

In addition, a layer of metallic plating may be formed followed by an electroplating step to provide a resistive alloy or a higher resistance metal alloy coating, for example, electroless Ni—P alloy over such metallic plating. It should be understood, however, that it is possible to include any metal coating as those of ordinary skill in the art will understand from the complete disclosure herewith.

It should be appreciated that any of the aforementioned steps can occur as a bulk process, such as a barrel plating, fluidized bed plating and/or flow-through plating terminal processes, all of which are generally known in the art. Such bulk processes enable multiple components to be processed at once, providing an efficient and expeditious terminal process. This is a particular advantage relative to conventional terminal methods, such as the printing of thick-film terminals that require individual component processing.

As described herein, the formation of the external terminals is generally guided by the position of the exposed leading edges of the lead tabs of the electrode layers. Such phenomena may be referred to as "self-determining" because the formation of the external plated terminals is determined by the configuration of the exposed conductive metal of the electrode layers at the selected peripheral locations on the capacitor. In some embodiments, the capacitor may include "dummy tabs" to provide exposed conductive metal along portions of the monolithic body of the capacitor that does not include other electrodes (e.g., active or shield electrodes).

It should be appreciated that additional technologies for forming capacitor terminals may also be within the scope of the present technology. Exemplary alternatives include, but are not limited to, formation of terminals by plating, magnetism, masking, electrophoretics/electrostatics, sputtering, vacuum deposition, printing or other techniques for forming both thick-film or thin-film conductive layers.

Figure 2A:
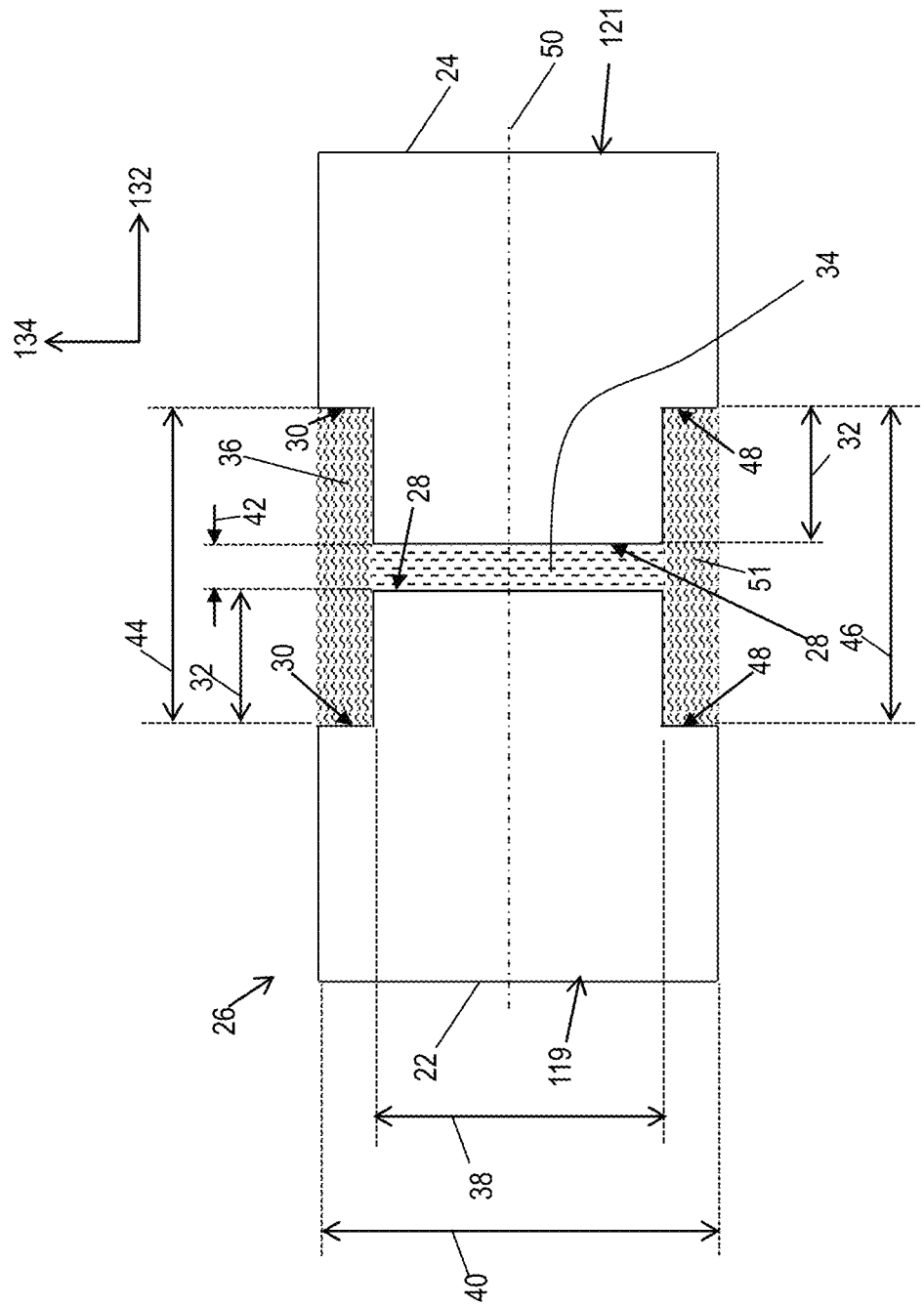
FIG. 2A illustrates a shield electrode layer, which may be included in a shield electrode region of the capacitor of FIGS. 1C, 3A, and 3B according to aspects of the present disclosure.

FIG. 2A illustrates a shield electrode layer 26, which may be included within the shield electrode region 16 (illustrated in FIG. 1C) within the monolithic body of the capacitor 100. As indicated above, the first shield electrode 22 may be parallel with the longitudinal direction 132 (e.g., parallel with the top and bottom surfaces 18, 20 illustrated in FIG. 1E). The first shield electrode 22 may have a first longitudinal edge 28 aligned with the lateral direction 134 and facing away from the first external terminal 118 (shown in FIG. 1E) and first end 119. The first shield electrode 22 may have a second longitudinal edge 30 aligned with the lateral direction 134 and facing away from the first external terminal (shown in FIG. 1E) and first end 119. The second longitudinal edge 30 may be offset in the longitudinal direction 132 from the first longitudinal edge 28 by a shield electrode offset distance 32.

The second shield electrode 24 may be connected with the second external terminal 120 (illustrated in FIG. 1E) and the second end 121. The second shield electrode 24 may be approximately aligned with the first shield electrode 22 in the Z-direction 136 (illustrated in FIG. 1E). The second shield electrode 24 may have a similar configuration to the first shield electrode 22. For example, the second shield electrode 24 may have a first longitudinal edge 28 aligned with the lateral direction 134 and facing away from the second external terminal 120 (illustrated in FIG. 1E) and second end 121. The second shield electrode 24 may have a second longitudinal edge 30 aligned with the lateral direction 134 and facing away from the second external terminal 120 (illustrated in FIG. 1E) and second end 121. The second longitudinal edge 30 of the second shield electrode 24 may be offset from the first longitudinal edge 28 of the second shield electrode 24 by the shield electrode offset distance 32 in the longitudinal direction 132.

A first shield capacitive region 34 may be formed between the first longitudinal edges 28 of the first and second shield electrodes 119, 121. A second shield capacitive region 36 may be formed between the second longitudinal edges 30 of the first and second shield electrodes 119, 121. In some embodiments, a width 38 of the first longitudinal edge 28 in the lateral direction 134 may be less than a width 40 of the first shield electrode 22 in the lateral direction 134.

A first shield gap distance 42 may be formed in the longitudinal direction 132 between the first longitudinal edge 28 of the first shield electrode 22 and the first longitudinal edge 28 of the second shield electrode 24. A second shield gap distance 44 may be formed in the longitudinal direction 132 between the second lateral edge 30 of the first shield electrode 22 and the second lateral edge 30 of the second shield electrode 22.

In some embodiments, a third shield gap distance 46 may be formed between a third longitudinal edge 48 of the first shield electrode 22 and a third longitudinal edge 48 of the second shield electrode 24. A third shield capacitive region 51 may be formed between the third longitudinal edges 48 of the first and second shield electrodes 119, 121. In some embodiments, the third shield gap distance 46 may be approximately equal to the second shield gap distance 44 such that the third shield capacitive region 51 may be substantially similar in size and shape to the second shield capacitive region 36. For example, in some embodiments the first shield electrode 22 and/or second shield electrode 24 may be symmetric about a longitudinal centerline 50 that extends in the longitudinal direction 132.

In other embodiments, however, the third shield gap distance 46 may be greater than or less than the second shield gap distance 44 such that the third capacitive region 51 is differently sized and/or shaped than the second capacitive region 36 and produces a different capacitance than the second capacitive region.

It should be understood that, in some embodiments, one or more of the shield electrodes 22, 24 may be rectangular. In other words, the shield electrode offset distance 32 may be zero or approximately zero such that the first longitudinal edge 28 and second longitudinal edge 30 are aligned or approximately aligned.

FIG. 2B illustrates another embodiment of a shield electrode layer 200. The shield electrode layer 200, which may be included within the shield electrode region 16 (illustrated in FIG. 1C) within the monolithic body of the capacitor 100. A first shield electrode 222 may be parallel with the longitudinal direction 132 (e.g., parallel with the top and bottom surfaces 18, 20 illustrated in FIG. 1E). The first shield electrode 222 may have a generally square or rectangular shape. The second shield electrode 224 may be connected with the second external terminal 120 (illustrated in FIGS. 1C and 1D) and the second end 121. The second shield electrode 224 may be approximately aligned with the first shield electrode 222 in the Z-direction 136 (illustrated in FIGS. 1C and 1D). The second shield electrode 224 may have a similar configuration to the first shield electrode 22. A single shield capacitive region 234 may be formed between the first shield electrode 222 and the second shield electrode 224.

Figure 2C:
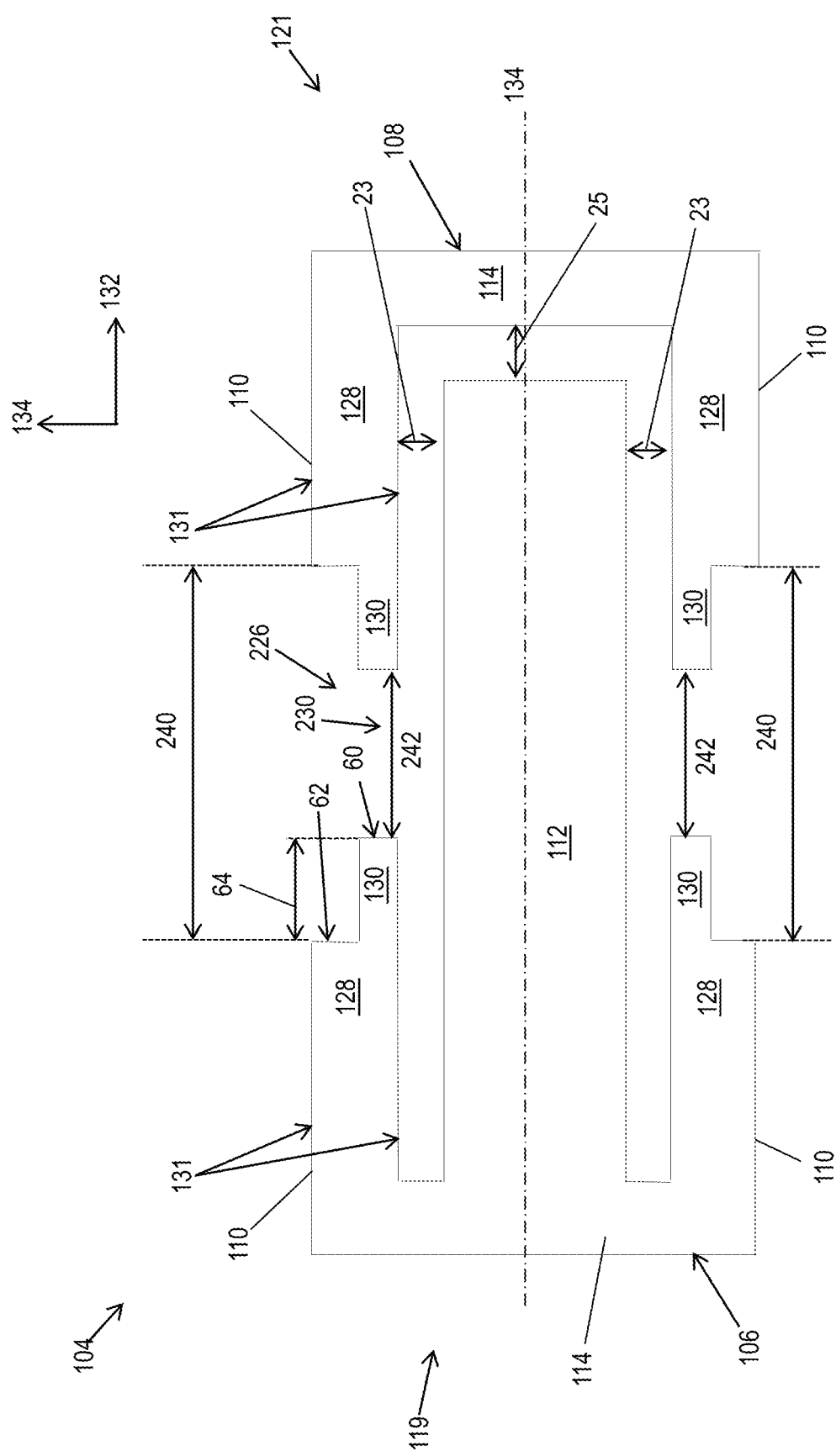
FIG. 2C illustrates another embodiment of an active electrode configuration according to aspects of the present disclosure.

In addition, FIG. 2C illustrates another embodiment of an active electrode 104 configuration according to aspects of the present disclosure. The active electrode 104 may include electrode arms 110 that include a main portion 128 and a step portion 130. More specifically, an electrode arm 110 of the first active electrode 106 may include a first longitudinal edge 60 that extends in the lateral direction 134 and may define an edge of the step portion 130. A second longitudinal edge 62 may extend in the lateral direction 134 and may define an edge of the main portion 128 of the arm 110. The first longitudinal edge 60 may be offset from the second longitudinal edge 62 in the longitudinal direction 132 by an arm offset distance 64. One or both electrode arms 110 of the first active electrode 106 and/or second electrode 108 may include respective main and step portions 128, 130. For example, both arms 110 of both electrodes 106, 108 may include respective main portions 128 and step portions 130, for example as illustrated in FIG. 2A. Main arm gaps 240 may be formed between the step portions 130 of aligned arms 110. Step arm gaps 242 may be formed between the main portions 128 of aligned arms 110.

Figure 2D:
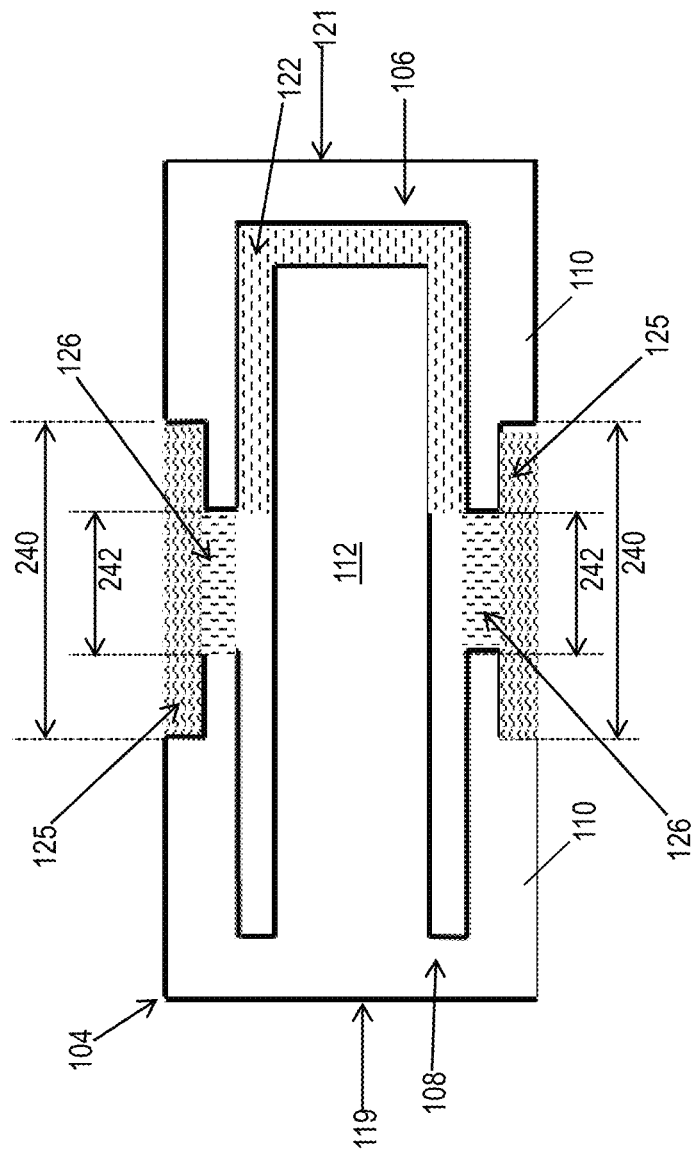
FIG. 2D illustrates multiple capacitive regions that may be formed between the first active electrode and the second electrode of the electrode pattern of FIG. 2C.

FIG. 2D illustrates multiple capacitive regions that may be formed between the first active electrode 106 and the second electrode 108 of the electrode pattern of FIG. 2C. For example, in some embodiments, a central capacitive region 122 may be formed between the central portion 112 of the first active electrode 106 and the base portion 114 and/or arms 110 of the second electrode 108. In some embodiments, a main arm gap capacitive region 125 may be formed within the main arm gap 240, and a step gap capacitive region 126 may be formed within the step arm gap 242.

Referring to FIG. 3A, in some embodiments, the dielectric region 12 and/or the additional dielectric region 115 may be free of electrode layers that extend greater than 25% of a length 21 of the capacitor 100 from a first end 119 or a second end 120 of the capacitor 100 (schematically illustrated by box 17). For example, in such embodiments, the dielectric region 12 and/or the additional dielectric region 115 may include one or more floating electrodes and/or dummy electrode tabs. However, in other embodiments, the dielectric region 12 and/or the additional dielectric region 115 may be free of all electrode layers, for example as described above with reference to FIGS. 1C and 1D. In some embodiments, the broadband multilayer ceramic capacitor 100 may be free of shield electrodes 22, 24 above a plurality of active electrode layers 102, 104 in the Z-direction 136. In some embodiments, the broadband multilayer ceramic capacitor 100 may be free of shield electrodes 22, 24 above a lowest electrode layer 19 of the plurality of active electrode layers 102, 104 in the Z-direction 136. The dummy tab electrodes 52, 54, 55, 57 may be aid to deposition and/or forming of the terminals 118, 120, for example using a fine copper terminal process. The dummy tab electrodes 52, 54, 55, 57 may extend less than 25% of the capacitor length 21 from the first end 119 or the second end 121. Additionally, in some embodiments, the region 115 between the shield electrode region 16 and the active electrode region 14 may include dummy tab electrodes 55, 57.

In some embodiments, the capacitor 100 may include one or more floating electrodes. The floating electrode 111 may be positioned in the dielectric region 12. However, in other embodiments, the floating electrode 111 may be positioned in the active electrode region 14. In general, such floating electrodes 111 are not directly connected to an external terminal 118, 120. The floating electrode may be positioned and configured according to any method known in the art. For instance, the floating electrode may be provided such that it overlaps at least a portion, such as a central portion, of a first active electrode and/or a second active electrode of an active electrode layer. In this regard, the floating electrode layer is layered and disposed alternately with the first electrode layers and the second internal electrode layers; in this regard, such layers may be separated by the dielectric layers. In addition, such floating electrodes may have any shape as generally known in the art. For instance, in one embodiment, the floating electrode layers may include at least one floating electrode having a dagger like configuration. For instance, such configuration may be similar to the configuration and shape of the first electrode as described herein. However, it should be understood that the first electrode may or may not contain an electrode arm with a step portion.

Figure 3B:
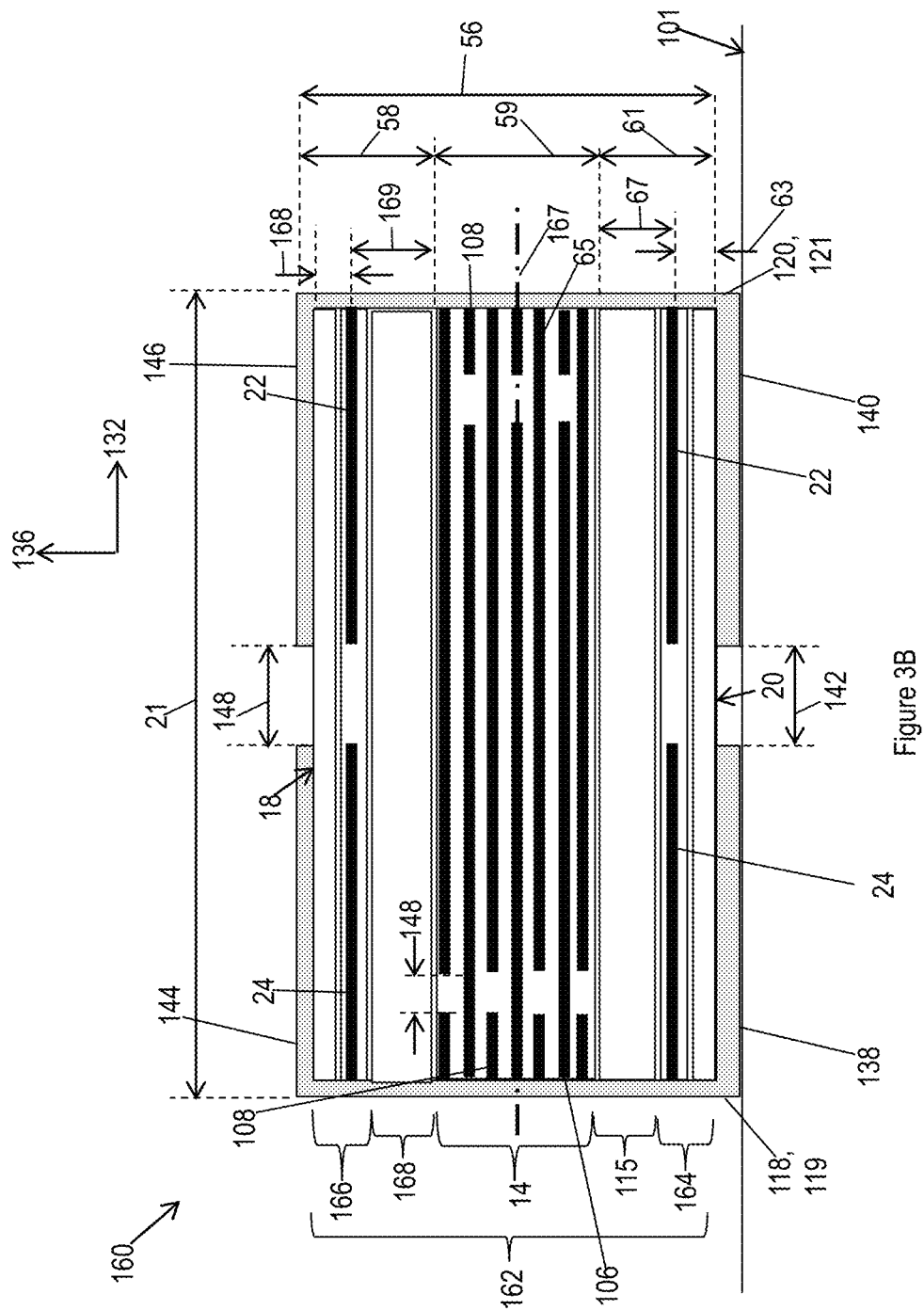
FIG. 3B illustrates a side cross sectional view of another embodiment of a capacitor including multiple shield electrode regions according to aspects of the present disclosure.

FIG. 3B illustrates another example embodiment of a capacitor 160 according to aspects of the present disclosure. The capacitor 160 may generally be similar to the capacitor 100 of FIG. 1D, except the capacitor 160 of FIG. 3B may include an additional shield electrode region 166. The capacitor 160 may generally be symmetric about a longitudinal centerline 165. The additional shield electrode region 166 may generally be configured like the shield electrode region 16. A dielectric region 168 between the active electrode region 14 and the additional shield electrode region 166 may generally be free of electrode layers or free of electrode layers that extend more than 25% of the length 21 of the capacitor 160 (e.g., the region 168 may include dummy electrodes in some embodiments). The capacitor 160 may be mounted as shown in FIG. 3B and also may be mounted in an orientation that is rotated 180 degrees about the longitudinal centerline 165.

FIG. 4A schematically illustrates three capacitive elements of the electrode pattern of FIG. 1C: a primary capacitive element 112' between adjacent electrode layers, a central capacitive element 122', and an arm gap capacitive element 124'. The capacitive elements 112', 122' and 124' correspond with the central area 112, central capacitive region 122 and arm gap capacitive region 124, respectively of FIG. 1B. In addition, external terminals are depicted as 118 and 128 in FIG. 4.

FIG. 4B schematically illustrates four capacitive elements of the electrode configuration of FIG. 2B, in which capacitive elements 112', 122' and 125', and 126' correspond with the central area 112, capacitive region 122, main arm gap capacitive region 125, and step gap capacitive region 126, respectively, of FIG. 2B. It should be understood that the dimensions of the various gaps may be selectively designed to achieve desired respective capacitance values for the capacitive elements illustrated in FIGS. 4A and 4B. More specifically, the configuration of the capacitor and various parameters such as the number of electrode layers, the surface area of the overlapping central portions of electrode pairs, the distance separating electrodes, the dielectric constant of the dielectric material, etc., may be selected to achieve desired capacitance values. Nevertheless, the capacitor as disclosed herein may include an array of combined series and parallel capacitors to provide effective broadband performance.

In one exemplary ultra-broadband capacitor embodiment, primary capacitor 112' generally corresponds to a relatively large capacitance adapted for operation at a generally lower frequency range, such as on the order of between about several kilohertz (kHz) to about 200 megahertz (MHz), while secondary capacitors 122', 124', 125' and/or 126' may generally correspond to relatively smaller value capacitors configured to operate at a relatively higher frequency range, such as on the order of between about 200 megahertz (MHz) to many gigahertz (GHz).

FIG. 5 illustrates another embodiment of an electrode pattern 150 for the active electrode layers 102, 104 and shield electrode layer(s) 15. The layers electrode pattern 150 may generally be similar to the electrode layer described above with reference to FIG. 1A. However, the central portion 112 may be enlarged in the lateral direction along a portion of the central portion 112. A central edge gap distance 23 may be defined in the lateral direction 134 between the central portion 122 of the first electrode and the second electrode arm 110. A central end gap distance 25 may be defined in the longitudinal direction 132 between the central portion 122 of the first active electrode 106 and the base portion 114 of the second active electrode 108. In some embodiments, the central edge gap distance 23 may be approximately equal to the central end gap distance 25.

The central portion 112 of the first active electrode 106 may have a first width 27 at a first location and a second width 29 at a second location that is greater than the first width 27. The first location of the first width 27 may be offset from the second location of the second width in the longitudinal direction 132. Such a configuration may allow for adjustment of an overlapping area between central portions 112 of adjacent electrodes in the Z-direction 136 without changing the central edge gap distance 23.

FIGS. 6A through 6D illustrate additional embodiments of electrode patterns for the active electrode layers 102, 104 and shield electrode layer(s) 15. For example, referring to FIG. 6A, in some embodiments, each of the first electrodes 106 and second electrodes 108 may include a single arm 110, instead a pair of arms 110, 202 as described above with respect to FIG. 2. In this regard, such electrodes may include one electrode containing a central portion that extends from a base and one electrode arm that also extends from the base portion; meanwhile, the counter electrode may include a base portion and only one electrode arm extending from the base portion of such second electrode.

Figure 6A:
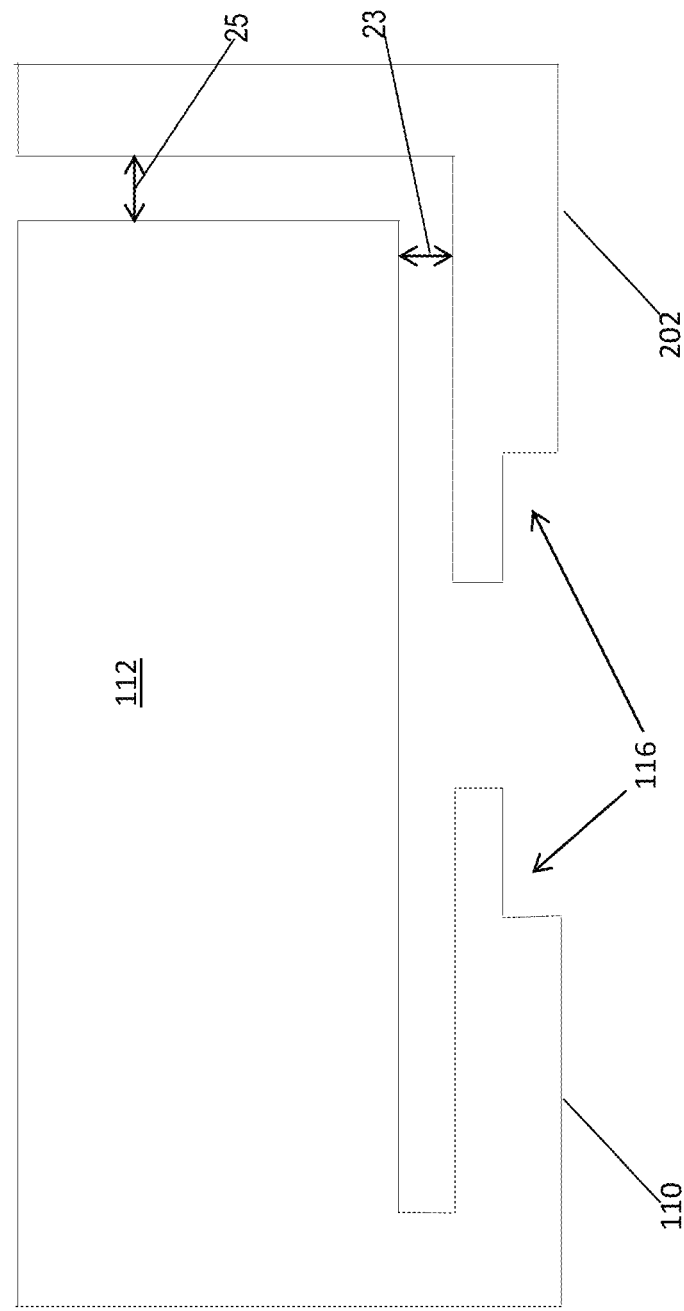
FIG. 6A illustrates a top view of an asymmetric electrode pattern for the active electrodes and shield electrode according to aspects of the present disclosure.
Figure 6B:
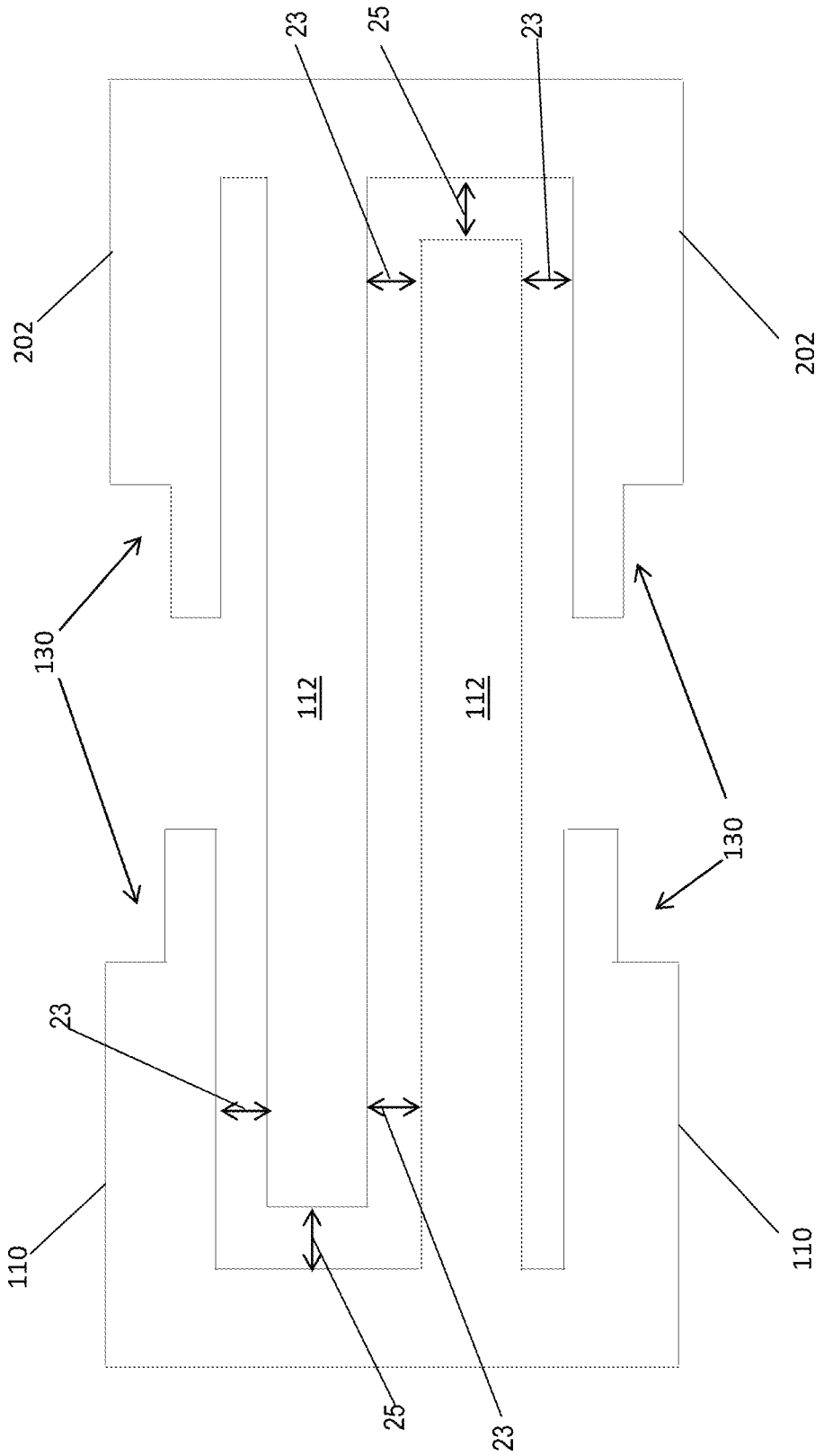
FIG. 6B illustrates a top view of another electrode pattern for the active electrodes and shield electrode according to aspects of the present disclosure.

Referring to FIG. 6B, in some embodiments, each of the first electrodes 106 and second electrodes 108 may include central portions 112. For instance, each electrode 106, 108 may include a central portion 112 that extends from a respective base portion in addition to at least one electrode arm 110, 202, such as two electrode arms 110, 202, that extend from the respective base portion.

Figure 6C:
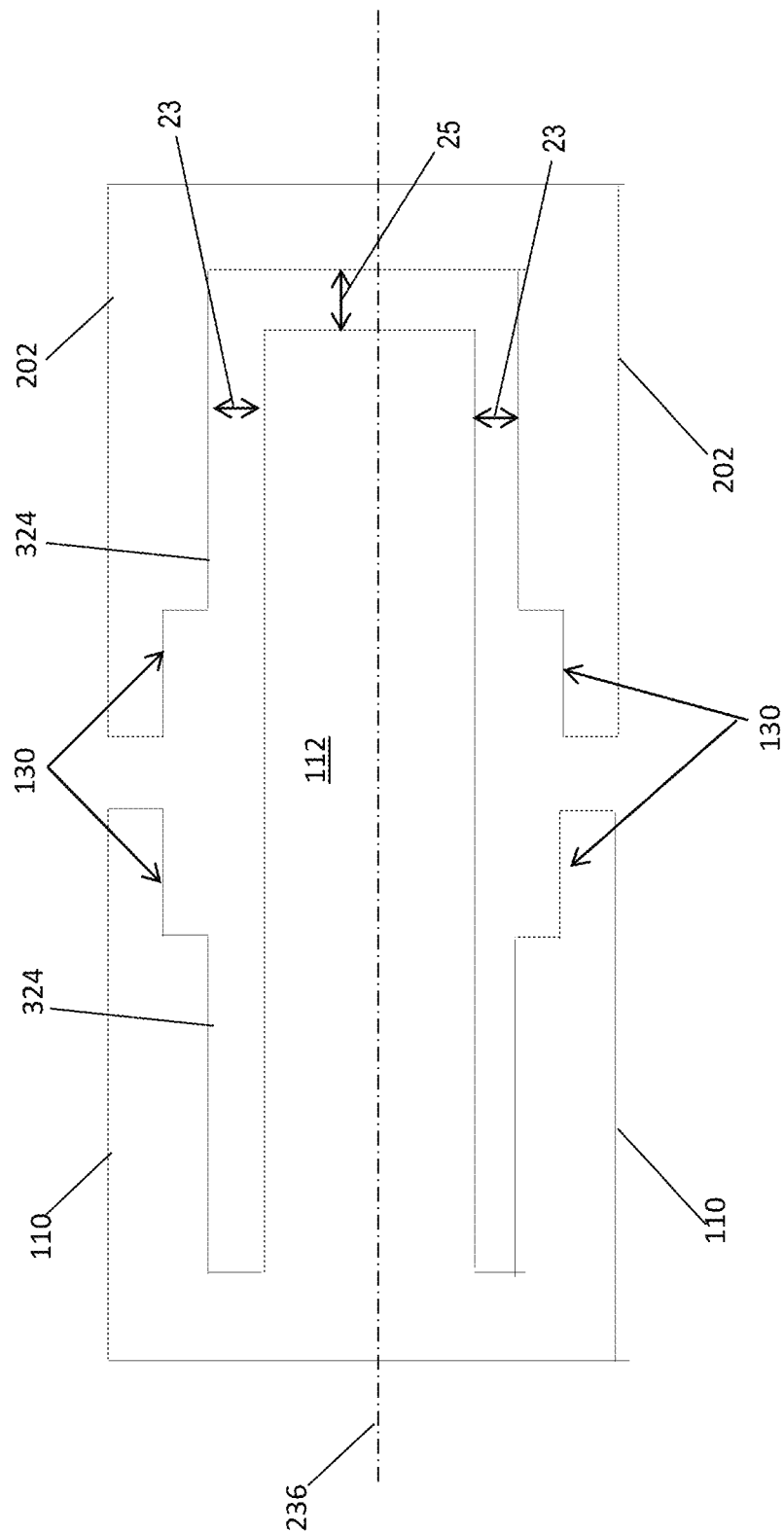
FIG. 6C illustrates a top view of another electrode pattern for the active electrodes and shield electrode according to aspects of the present disclosure.
Figure 6D:
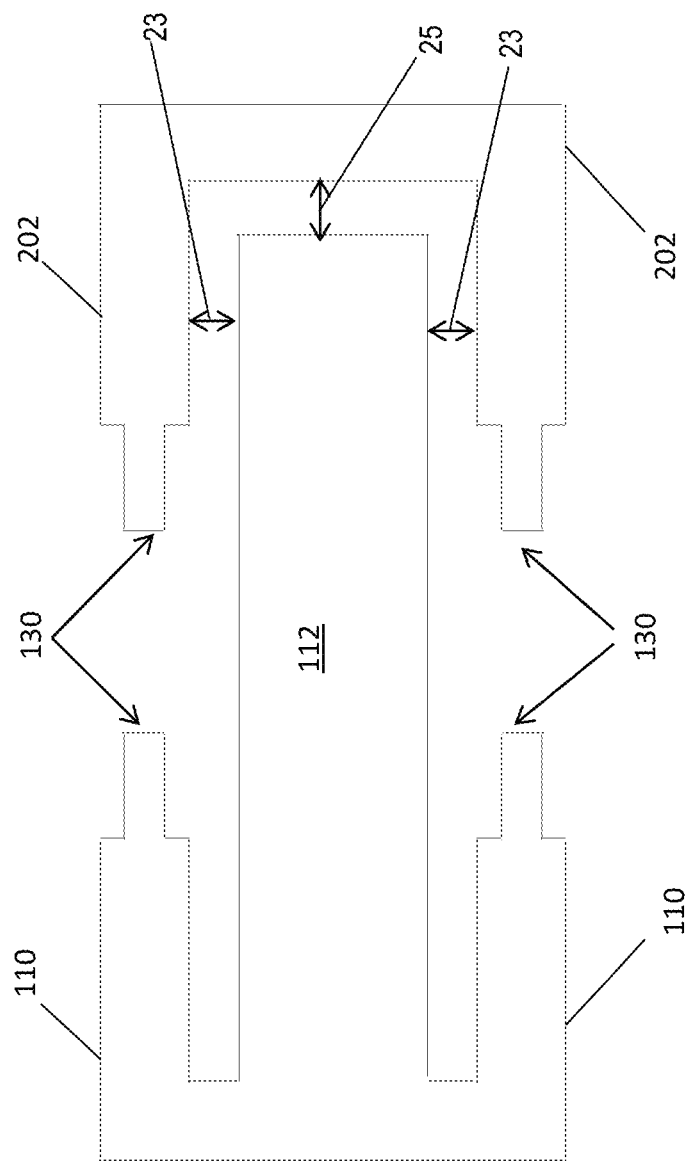
FIG. 6D illustrates a top view of another electrode pattern for the active electrodes and shield electrode according to aspects of the present disclosure.

Referring to FIG. 6C, in some embodiments, the electrode arms 110, 202 of the electrodes 106, 108 may have a step portion 130 that is outwardly offset from an inner lateral edge 324 of the main portion of an electrode arm away from a lateral centerline 236 of the at least one of the electrodes 106, 108 of the electrode layers. Lastly, referring to FIG. 6D, in some embodiments, the electrode arms 110 of the electrodes 106, 108 may have step portions 130 that are offset from both the outer lateral edge 322 and the inner lateral edge 324 of the electrode arms 110, 202. In addition to the embodiments illustrated and described herein, the electrode pattern of the active electrode layers and shield electrode layers may have any suitable configuration known in the art.

II. Test Methods

A testing assembly can be used to test performance characteristics, such as insertion loss and return loss, of a capacitor according to aspects of the present disclosure. For example, the capacitor can be mounted to a test board. An input line and an output line can each be connected with the test board. The test board can include microstrip lines electrically connecting the input line and output lines with respective external terminals of the capacitor.

An input signal can be applied to the input line using a source signal generator (e.g., a 1806 Keithley 2400 series Source Measure Unit (SMU), for example, a Keithley 2410-C SMU) and the resulting output signal of the capacitor can be measured at the output line (e.g., using the source signal generator). This was repeated for various configurations of the capacitor.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A broadband multilayer ceramic capacitor comprising:
a monolithic body comprising a plurality of dielectric layers stacked in a Z-direction;
a first external terminal plated along a first end of the capacitor, the first external terminal including a bottom portion that extends along a bottom surface of the capacitor;
a second external terminal plated along a second end of the capacitor that is opposite the first end in a longitudinal direction, the second external terminal including a bottom portion that extends along the bottom surface of the capacitor, the bottom portion of the first external terminal and the bottom portion of the second external terminal being spaced apart in the longitudinal direction by a bottom external terminal spacing distance;
a plurality of active electrode layers, wherein a first active electrode layer of the plurality of active electrode layers comprises a first active electrode connected with the first external terminal and a second active electrode connected with the second external terminal, the second electrode being co-planar with the first electrode, and wherein a second active electrode layer of the plurality of active electrode layers comprises a third active electrode connected with the first external terminal and a fourth active electrode connected with the second external terminal, the third electrode being co-planar with the fourth electrode, and wherein the first active electrode overlaps with the fourth active electrode in the longitudinal direction, wherein:
the capacitor has a capacitor length in the longitudinal direction between the first end and the second end,
a ratio of the capacitor length to the bottom external terminal spacing distance is greater than about 4,
the first active electrode has a central portion that extends away from a base portion of the first active electrode in the longitudinal direction,
the second active electrode comprises a base portion and at least one arm extending towards the first end in the longitudinal direction and overlapping the central portion of the first active electrode in the longitudinal direction,
a central end gap distance is formed in the longitudinal direction between the central portion of the first active electrode and the base portion of the second active electrode, and
a ratio of the central end gap distance to the bottom external terminal spacing distance ranges from about 0.5 to about 2.

2. The broadband multilayer ceramic capacitor of claim 1, wherein the bottom external terminal spacing distance is less than about 250 microns.

3. The broadband multilayer ceramic capacitor of claim 1, wherein the central end gap distance is less than about 250 microns.

4. The broadband multilayer ceramic capacitor of claim 1, wherein a central edge gap distance is formed in a lateral direction between the central portion of the first active electrode and the at least one arm of the second active electrode, and wherein a ratio of the central edge gap distance to the bottom external terminal spacing distance ranges from about 0.5 to about 2.

5. The broadband multilayer ceramic capacitor of claim 1, wherein a central edge gap distance is formed in a lateral direction between the central portion of the first active electrode and the at least one arm of the second active electrode, wherein the central edge gap distance is less than about 250 microns.

6. The broadband multilayer ceramic capacitor of claim 1, wherein the first active electrode overlaps with the fourth active electrode in the longitudinal direction for an overlap distance, and wherein a ratio of the overlap distance to the capacitor length is greater than about 0.4.

7. The broadband multilayer ceramic capacitor of claim 1, further comprising at least one shield electrode layer comprising a first shield electrode connected with the first external terminal and a second shield electrode connected with the second external terminal, the second shield electrode being co-planar with the first shield electrode.

8. The broadband multilayer ceramic capacitor of claim 7, wherein a shield electrode gap distance is formed between the first shield electrode and the second shield electrode in the longitudinal direction, and a ratio of the shield electrode gap distance to the bottom external terminal spacing distance ranges from about 0.5 to about 2.

9. The broadband multilayer ceramic capacitor of claim 7, wherein the at least one shield electrode layer is spaced apart from the bottom surface of the capacitor by a bottom-shield-to-bottom distance, and the bottom-shield-to-bottom distance ranges from about 8 microns to about 100 microns.

10. The broadband multilayer ceramic capacitor of claim 1, further comprising:
an active electrode region comprising the plurality of active electrode layers; and
a dielectric region located between the active electrode region and a top surface of the capacitor in the Z-direction.

11. The broadband multilayer ceramic capacitor of claim 10, wherein the broadband multilayer ceramic capacitor has a capacitor thickness in the Z-direction between the top surface and the bottom surface, and the dielectric region has a dielectric region thickness in the Z-direction, and a ratio of the capacitor thickness to the dielectric region thickness is less than about 20.

12. The broadband multilayer ceramic capacitor of claim 10, wherein the dielectric region is free of electrode layers that extend greater than 25% of the capacitor length from the first end or the second end.

13. The broadband multilayer ceramic capacitor of claim 10, wherein the dielectric region includes a first plurality of dummy electrode tabs connected with the first external terminal and a second plurality of dummy electrode tabs connected with the second external terminal.

14. A method of forming a broadband multilayer ceramic capacitor, the method comprising:
forming a plurality of active electrodes on a plurality of active electrode layers, wherein at least one active electrode layer of the plurality of active electrode layers comprises a first active electrode and a second active electrode, and wherein the second electrode is co-planar with the first electrode, and wherein a second active electrode layer of the plurality of active electrode layers comprises a third active electrode and the fourth active electrode, the third electrode being co-planar with the fourth electrode, and wherein the first active electrode overlaps with the fourth active electrode in a longitudinal direction;
stacking the plurality of active electrode layers with a plurality of dielectric layers along a Z-direction to form a monolithic body;
plating a first external terminal along a first end of the capacitor that connects with the first active electrode and the third active electrode, the first external terminal including a bottom portion that extends along a bottom surface of the capacitor; and
plating a second external terminal along a second end of the capacitor that is opposite the first end, the second external terminal connecting with the second active electrode and the fourth active electrode, wherein the second external terminal including a bottom portion that extends along the bottom surface of the capacitor, the bottom portion of the first external terminal and the bottom portion of the second external terminal being spaced apart in the longitudinal direction by a bottom external terminal spacing distance, wherein:
the capacitor has a capacitor length in the longitudinal direction between the first end and the second end,
a ratio of the capacitor length to the bottom external terminal spacing distance is greater than about 4,
the first active electrode has a central portion that extends away from a base portion of the first active electrode in the longitudinal direction,
the second active electrode comprises a base portion and at least one arm extending towards the first end in the longitudinal direction and overlapping the central portion of the first active electrode in the longitudinal direction,
a central edge gap distance is formed in a lateral direction between the central portion of the first active electrode and the at least one arm of the second active electrode, and
a ratio of the central edge gap distance to the bottom external terminal spacing distance ranges from about 0.5 to about 2.

15. The broadband multilayer ceramic capacitor of claim 7, wherein the first shield electrode comprises a central portion that extends away from a base portion of the first shield electrode in the longitudinal direction, and wherein the second shield electrode comprises a base portion and at least one arm extending away from the base portion of the second shield electrode towards the first end in the longitudinal direction and overlapping the central portion of the first shield electrode in the longitudinal direction.

16. The broadband multilayer ceramic capacitor of claim 1, wherein the ratio of the capacitor length to the bottom external terminal spacing distance is greater than 20.

17. A broadband multilayer ceramic capacitor comprising:
a monolithic body comprising a plurality of dielectric layers stacked in a Z-direction;
a first external terminal plated along a first end of the capacitor, the first external terminal including a bottom portion that extends along a bottom surface of the capacitor;
a second external terminal plated along a second end of the capacitor that is opposite the first end in the longitudinal direction, the second external terminal including a bottom portion that extends along the bottom surface of the capacitor, the bottom portion of the first external terminal and the bottom portion of the second external terminal being spaced apart in a longitudinal direction by a bottom external terminal spacing distance;
a plurality of active electrode layers, wherein a first active electrode layer of the plurality of active electrode layers comprises a first active electrode connected with the first external terminal and a second active electrode connected with the second external terminal, the second electrode being co-planar with the first electrode, and wherein a second active electrode layer of the plurality of active electrode layers comprises a third active electrode connected with the first external terminal and a fourth active electrode connected with the second external terminal, the third electrode being co-planar with the fourth electrode, and wherein the first active electrode overlaps with the fourth active electrode in the longitudinal direction; and
at least one shield electrode layer comprising a first shield electrode connected with the first external terminal and a second shield electrode connected with the second external terminal, the second shield electrode being co-planar with the first shield electrode, wherein:
the capacitor has a capacitor length in the longitudinal direction between the first end and the second end,
a ratio of the capacitor length to the bottom external terminal spacing distance is greater than about 4,
a shield electrode gap distance is formed between the first shield electrode and the second shield electrode in the longitudinal direction, and
a ratio of the shield electrode gap distance to the bottom external terminal spacing distance ranges from about 0.5 to about 2.

* * * * *